(12) United States Patent
Chawda et al.

(10) Patent No.: US 12,099,653 B2
(45) Date of Patent: Sep. 24, 2024

(54) USER INTERFACE RESPONSE BASED ON GAZE-HOLDING EVENT ASSESSMENT

(71) Applicant: Apple Inc., Cupertino, CA (US)

(72) Inventors: Vinay Chawda, Santa Clara, CA (US); Mehmet N. Agaoglu, Dublin, CA (US); Leah M. Gum, Sunol, CA (US); Paul A. Lacey, Santa Clara, CA (US); Julian K. Shutzberg, San Francisco, CA (US); Tim H. Cornelissen, Mountain View, CA (US); Alexander G. Berardino, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/244,570

(22) Filed: Sep. 11, 2023

(65) Prior Publication Data

US 2024/0103613 A1 Mar. 28, 2024

Related U.S. Application Data

(60) Provisional application No. 63/409,147, filed on Sep. 22, 2022, provisional application No. 63/453,506, filed on Mar. 21, 2023.

(51) Int. Cl.
*G06F 3/01* (2006.01)
*G06F 3/04842* (2022.01)

(52) U.S. Cl.
CPC .............. *G06F 3/013* (2013.01); *G06F 3/017* (2013.01); *G06F 3/04842* (2013.01)

(58) Field of Classification Search
CPC ....... G06F 3/013; G06F 3/017; G06F 3/04842
See application file for complete search history.

(56) References Cited

U.S. PATENT DOCUMENTS

| 5,515,488 A | 5/1996 | Hoppe |
| 5,524,195 A | 6/1996 | Clanton, III |

(Continued)

FOREIGN PATENT DOCUMENTS

| CA | 3033344 A1 | 2/2018 |
| CN | 104714771 A | 6/2015 |

(Continued)

OTHER PUBLICATIONS

U.S. Patent and Trademark Office, Non-Final Office Action, U.S. Appl. No. 18/244,570, 33 pages, May 29, 2024.

(Continued)

*Primary Examiner* — Cao H Nguyen
(74) *Attorney, Agent, or Firm* — Thompson Hine LLP

(57) ABSTRACT

Various implementations provide views of 3D environments (e.g., extended reality (XR) environments). Non-eye-based user activity, such as hand gestures, is associated with some types of eye-based activity, such as the user gazing at a particular user interface component displayed within a view of a 3D environment. For example, a user's pinching hand gesture may be associated with the user gazing at a particular user interface component, such as a button, at around the same time as the pinching hand gesture is made. These associated behaviors (e.g., the pinch and gaze at the button) may then be interpreted as user input, e.g., user input selecting or otherwise acting upon that user interface component. In some implementations, non-eye-based user activity is only associated with types of eye-based user activity that are likely to correspond to a user perceiving what they are seeing and/or intentionally looking at something.

25 Claims, 7 Drawing Sheets

(56) References Cited

U.S. PATENT DOCUMENTS

| | | |
|---|---|---|
| 5,610,828 A | 3/1997 | Kodosky |
| 5,737,553 A | 4/1998 | Bartok |
| 5,740,440 A | 4/1998 | West |
| 5,751,287 A | 5/1998 | Hahn |
| 5,758,122 A | 5/1998 | Corda |
| 5,794,178 A | 8/1998 | Caid |
| 5,877,766 A | 3/1999 | Bates |
| 5,900,849 A | 5/1999 | Gallery |
| 5,933,143 A | 8/1999 | Kobayashi |
| 5,990,886 A | 11/1999 | Serdy |
| 6,061,060 A | 5/2000 | Berry |
| 6,108,004 A | 8/2000 | Medl |
| 6,112,015 A | 8/2000 | Planas |
| 6,154,559 A | 11/2000 | Beardsley |
| 6,456,296 B1 | 9/2002 | Cataudella |
| 6,584,465 B1 | 6/2003 | Zhu |
| 6,756,997 B1 | 6/2004 | Ward, III |
| 7,035,903 B1 | 4/2006 | Baldonado |
| 7,137,074 B1 | 11/2006 | Newton |
| 7,230,629 B2 | 6/2007 | Reynolds |
| 8,793,620 B2 | 7/2014 | Stafford |
| 8,803,873 B2 | 8/2014 | Yoo |
| 8,947,323 B1 | 2/2015 | Raffle |
| 8,970,478 B2 | 3/2015 | Johansson |
| 8,970,629 B2 | 3/2015 | Kim |
| 8,994,718 B2 | 3/2015 | Latta |
| 9,007,301 B1 | 4/2015 | Raffle et al. |
| 9,185,062 B1 | 11/2015 | Yang |
| 9,201,500 B2 | 12/2015 | Srinivasan et al. |
| 9,256,785 B2 | 2/2016 | Qvarfordt |
| 9,400,559 B2 | 7/2016 | Latta |
| 9,448,635 B2 | 9/2016 | MacDougall |
| 9,465,479 B2 | 10/2016 | Cho |
| 9,526,127 B1 | 12/2016 | Taubman et al. |
| 9,563,331 B2 | 2/2017 | Poulos |
| 9,575,559 B2 | 2/2017 | Andrysco |
| 9,681,112 B2 | 6/2017 | Son |
| 9,684,372 B2 | 6/2017 | Xun |
| 9,734,402 B2 | 8/2017 | Jang et al. |
| 9,778,814 B2 | 10/2017 | Ambrus |
| 9,851,866 B2 | 12/2017 | Goossens |
| 9,886,087 B1 | 2/2018 | Wald |
| 9,933,833 B2 | 4/2018 | Tu |
| 9,934,614 B2 | 4/2018 | Ramsby |
| 10,049,460 B2 | 8/2018 | Romano |
| 10,203,764 B2 | 2/2019 | Katz |
| 10,307,671 B2 | 6/2019 | Barney |
| 10,353,532 B1 | 7/2019 | Holz |
| 10,394,320 B2 | 8/2019 | George-Svahn et al. |
| 10,534,439 B2 | 1/2020 | Raffa |
| 10,664,048 B2 | 5/2020 | Cieplinski |
| 10,664,050 B2 | 5/2020 | Alcaide et al. |
| 10,699,488 B1 | 6/2020 | Terrano |
| 10,732,721 B1 | 8/2020 | Clements |
| 10,754,434 B2 | 8/2020 | Hall |
| 10,768,693 B2 | 9/2020 | Powderly |
| 10,861,242 B2 | 12/2020 | Lacey et al. |
| 10,890,967 B2 | 1/2021 | Stellmach |
| 10,956,724 B1 | 3/2021 | Terrano |
| 10,983,663 B2 | 4/2021 | Iglesias |
| 11,055,920 B1 | 7/2021 | Bramwell |
| 11,112,875 B1 | 9/2021 | Zhou et al. |
| 11,199,898 B2 | 12/2021 | Blume et al. |
| 11,200,742 B1 | 12/2021 | Post |
| 11,262,840 B2 | 3/2022 | Bychkov et al. |
| 11,294,472 B2 | 4/2022 | Tang et al. |
| 11,294,475 B1 | 4/2022 | Pinchon |
| 11,340,756 B2 | 5/2022 | Faulkner et al. |
| 11,348,300 B2 | 5/2022 | Zimmermann |
| 11,461,973 B2 | 10/2022 | Pinchon |
| 11,573,363 B2 | 2/2023 | Zou et al. |
| 11,573,631 B2 | 2/2023 | Cederlund et al. |
| 11,574,452 B2 | 2/2023 | Berliner et al. |
| 1,173,824 A1 | 8/2023 | Iskandar et al. |
| 11,720,171 B2 | 8/2023 | Pastrana Vicente et al. |
| 11,726,577 B2 | 8/2023 | Katz |
| 11,733,824 B2 | 8/2023 | Iskandar |
| 2001/0047250 A1 | 11/2001 | Schuller |
| 2002/0044152 A1 | 4/2002 | Abbott |
| 2003/0151611 A1 | 8/2003 | Turpin |
| 2003/0222924 A1 | 12/2003 | Baron |
| 2004/0059784 A1 | 3/2004 | Caughey |
| 2004/0243926 A1 | 12/2004 | Trenbeath |
| 2005/0100210 A1 | 5/2005 | Rice |
| 2005/0138572 A1 | 6/2005 | Good |
| 2005/0144570 A1 | 6/2005 | Loverin |
| 2005/0144571 A1 | 6/2005 | Loverin |
| 2005/0198143 A1 | 9/2005 | Moody |
| 2006/0080702 A1 | 4/2006 | Diez |
| 2006/0283214 A1 | 12/2006 | Donadon |
| 2008/0211771 A1 | 9/2008 | Richardson |
| 2009/0064035 A1 | 3/2009 | Shibata |
| 2009/0231356 A1 | 9/2009 | Barnes |
| 2010/0097375 A1 | 4/2010 | Tadaishi |
| 2010/0188503 A1 | 7/2010 | Tsai |
| 2011/0018895 A1 | 1/2011 | Buzyn |
| 2011/0018896 A1 | 1/2011 | Buzyn |
| 2011/0216060 A1 | 9/2011 | Weising |
| 2011/0254865 A1 | 10/2011 | Yee |
| 2011/0310001 A1 | 12/2011 | Madau |
| 2012/0113223 A1 | 5/2012 | Hilliges |
| 2012/0170840 A1 | 7/2012 | Caruso |
| 2012/0218395 A1 | 8/2012 | Andersen |
| 2012/0257035 A1 | 10/2012 | Larsen |
| 2013/0127850 A1 | 5/2013 | Bindon |
| 2013/0154913 A1 | 6/2013 | Genc et al. |
| 2013/0211843 A1 | 8/2013 | Clarkson |
| 2013/0229345 A1 | 9/2013 | Day |
| 2013/0271397 A1 | 10/2013 | MacDougall |
| 2013/0278501 A1 | 10/2013 | Bulzacki |
| 2013/0283213 A1 | 10/2013 | Guendelman et al. |
| 2013/0286004 A1 | 10/2013 | McCulloch |
| 2013/0307775 A1 | 11/2013 | Raynor |
| 2013/0326364 A1 | 12/2013 | Latta |
| 2013/0342564 A1 | 12/2013 | Kinnebrew |
| 2013/0342570 A1 | 12/2013 | Kinnebrew |
| 2014/0002338 A1 | 1/2014 | Raffa |
| 2014/0028548 A1 | 1/2014 | Bychkov |
| 2014/0075361 A1 | 3/2014 | Reynolds |
| 2014/0108942 A1 | 4/2014 | Freeman |
| 2014/0125584 A1 | 5/2014 | Xun |
| 2014/0184644 A1 | 7/2014 | Sharma |
| 2014/0198017 A1 | 7/2014 | Lamb |
| 2014/0258942 A1 | 9/2014 | Kutliroff et al. |
| 2014/0282272 A1 | 9/2014 | Kies |
| 2014/0320404 A1 | 10/2014 | Kasahara |
| 2014/0347391 A1 | 11/2014 | Keane |
| 2015/0035822 A1 | 2/2015 | Arsan |
| 2015/0035832 A1 | 2/2015 | Sugden |
| 2015/0067580 A1 | 3/2015 | Um |
| 2015/0123890 A1 | 5/2015 | Kapur |
| 2015/0153833 A1 | 6/2015 | Pinault et al. |
| 2015/0177937 A1 | 6/2015 | Poletto |
| 2015/0187093 A1 | 7/2015 | Chu |
| 2015/0205106 A1 | 7/2015 | Norden |
| 2015/0220152 A1 | 8/2015 | Tait et al. |
| 2015/0242095 A1 | 8/2015 | Sonnenberg |
| 2015/0317832 A1 | 11/2015 | Ebstyne |
| 2015/0331576 A1 | 11/2015 | Piya |
| 2015/0332091 A1 | 11/2015 | Kim |
| 2015/0370323 A1 | 12/2015 | Cieplinski |
| 2016/0015470 A1 | 1/2016 | Border |
| 2016/0018898 A1 | 1/2016 | Tu |
| 2016/0018900 A1 | 1/2016 | Tu |
| 2016/0026242 A1 | 1/2016 | Burns et al. |
| 2016/0026253 A1 | 1/2016 | Bradski |
| 2016/0062636 A1 | 3/2016 | Jung |
| 2016/0093108 A1 | 3/2016 | Mao |
| 2016/0098094 A1 | 4/2016 | Minkkinen |
| 2016/0171304 A1 | 6/2016 | Golding |
| 2016/0196692 A1 | 7/2016 | Kjallstrom |
| 2016/0239080 A1 | 8/2016 | Marcolina et al. |
| 2016/0253063 A1 | 9/2016 | Critchlow |
| 2016/0253821 A1 | 9/2016 | Romano |

(56) References Cited

U.S. PATENT DOCUMENTS

| | | |
|---|---|---|
| 2016/0275702 A1 | 9/2016 | Reynolds |
| 2016/0306434 A1 | 10/2016 | Ferrin |
| 2016/0313890 A1 | 10/2016 | Walline |
| 2016/0379409 A1 | 12/2016 | Gavriliuc |
| 2017/0038829 A1 | 2/2017 | Lanier |
| 2017/0038837 A1 | 2/2017 | Faaborg |
| 2017/0038849 A1 | 2/2017 | Hwang |
| 2017/0039770 A1 | 2/2017 | Lanier |
| 2017/0060230 A1 | 3/2017 | Faaborg |
| 2017/0123487 A1 | 5/2017 | Hazra |
| 2017/0131964 A1 | 5/2017 | Baek |
| 2017/0132694 A1 | 5/2017 | Damy |
| 2017/0132822 A1 | 5/2017 | Marschke |
| 2017/0153866 A1 | 6/2017 | Grinberg |
| 2017/0206691 A1 | 7/2017 | Harrises et al. |
| 2017/0228130 A1 | 8/2017 | Palmaro |
| 2017/0285737 A1 | 10/2017 | Khalid |
| 2017/0315715 A1 | 11/2017 | Fujita |
| 2017/0344223 A1 | 11/2017 | Holzer |
| 2017/0358141 A1 | 12/2017 | Stafford |
| 2018/0045963 A1 | 2/2018 | Hoover |
| 2018/0059928 A1 | 3/2018 | Westerman et al. |
| 2018/0075658 A1 | 3/2018 | Lanier |
| 2018/0081519 A1 | 3/2018 | Kim |
| 2018/0095634 A1 | 4/2018 | Alexander |
| 2018/0095635 A1 | 4/2018 | Valdivia |
| 2018/0101223 A1 | 4/2018 | Ishihara |
| 2018/0114364 A1 | 4/2018 | McPhee |
| 2018/0150997 A1 | 5/2018 | Austin |
| 2018/0158222 A1 | 6/2018 | Hayashi |
| 2018/0181199 A1 | 6/2018 | Harvey |
| 2018/0188802 A1 | 7/2018 | Okumura |
| 2018/0210628 A1 | 7/2018 | McPhee |
| 2018/0239144 A1 | 8/2018 | Woods |
| 2018/0300023 A1 | 10/2018 | Hein |
| 2018/0315248 A1 | 11/2018 | Bastov |
| 2018/0322701 A1 | 11/2018 | Pahud |
| 2018/0348861 A1 | 12/2018 | Uscinski |
| 2019/0034076 A1 | 1/2019 | Vinayak |
| 2019/0050062 A1 | 2/2019 | Chen |
| 2019/0080572 A1 | 3/2019 | Kim |
| 2019/0088149 A1 | 3/2019 | Fink |
| 2019/0094979 A1 | 3/2019 | Hall |
| 2019/0101991 A1 | 4/2019 | Brennan |
| 2019/0130633 A1 | 5/2019 | Haddad |
| 2019/0146128 A1 | 5/2019 | Cao |
| 2019/0204906 A1 | 7/2019 | Ross |
| 2019/0227763 A1 | 7/2019 | Kaufthal |
| 2019/0258365 A1 | 8/2019 | Zurmoehle |
| 2019/0310757 A1 | 10/2019 | Lee |
| 2019/0324529 A1 | 10/2019 | Stellmach et al. |
| 2019/0339770 A1* | 11/2019 | Kurlethimar ........ G02B 27/017 |
| 2019/0362557 A1 | 11/2019 | Lacey |
| 2019/0371072 A1 | 12/2019 | Lindberg |
| 2019/0377487 A1 | 12/2019 | Bailey |
| 2019/0379765 A1 | 12/2019 | Fajt |
| 2019/0384406 A1 | 12/2019 | Smith |
| 2020/0004401 A1 | 1/2020 | Hwang |
| 2020/0043243 A1 | 2/2020 | Bhushan |
| 2020/0082602 A1 | 3/2020 | Jones |
| 2020/0089314 A1 | 3/2020 | Poupyrev |
| 2020/0098140 A1 | 3/2020 | Jagnow |
| 2020/0098173 A1 | 3/2020 | McCall |
| 2020/0117213 A1 | 4/2020 | Tian |
| 2020/0159017 A1 | 5/2020 | Lin |
| 2020/0225747 A1 | 7/2020 | Bar-Zeev |
| 2020/0225830 A1 | 7/2020 | Tang et al. |
| 2020/0226814 A1 | 7/2020 | Tang |
| 2020/0356221 A1 | 11/2020 | Behzadi |
| 2020/0357374 A1 | 11/2020 | Verweij |
| 2020/0387228 A1 | 12/2020 | Ravasz |
| 2021/0064142 A1 | 3/2021 | Stern et al. |
| 2021/0074062 A1 | 3/2021 | Madonna |
| 2021/0090337 A1 | 3/2021 | Ravasz |
| 2021/0096726 A1 | 4/2021 | Faulkner |
| 2021/0141525 A1 | 5/2021 | Piemonte et al. |
| 2021/0191600 A1 | 6/2021 | Lemay et al. |
| 2021/0295602 A1 | 9/2021 | Scapel |
| 2021/0303074 A1 | 9/2021 | Vanblon |
| 2021/0319617 A1 | 10/2021 | Ahn |
| 2021/0327140 A1 | 10/2021 | Rothkopf |
| 2021/0339134 A1 | 11/2021 | Knoppert et al. |
| 2021/0350564 A1 | 11/2021 | Peuhkurinen |
| 2021/0357073 A1 | 11/2021 | Kandadai et al. |
| 2021/0375022 A1 | 12/2021 | Lee |
| 2022/0011855 A1 | 1/2022 | Hazra |
| 2022/0030197 A1 | 1/2022 | Ishimoto |
| 2022/0083197 A1 | 3/2022 | Rockel |
| 2022/0092862 A1 | 3/2022 | Faulkner |
| 2022/0101593 A1 | 3/2022 | Rockel |
| 2022/0101612 A1 | 3/2022 | Palangie |
| 2022/0104910 A1 | 4/2022 | Shelton, IV et al. |
| 2022/0121344 A1 | 4/2022 | Pastrana Vicente et al. |
| 2022/0137705 A1 | 5/2022 | Hashimoto |
| 2022/0157083 A1 | 5/2022 | Jandhyala |
| 2022/0187907 A1 | 6/2022 | Lee et al. |
| 2022/0191570 A1 | 6/2022 | Reid |
| 2022/0229524 A1 | 7/2022 | McKenzie et al. |
| 2022/0229534 A1 | 7/2022 | Terre |
| 2022/0236795 A1 | 7/2022 | Jonker |
| 2022/0245888 A1 | 8/2022 | Singh |
| 2022/0253149 A1* | 8/2022 | Berliner .................. G06F 1/163 |
| 2022/0276720 A1 | 9/2022 | Yasui |
| 2022/0326837 A1 | 10/2022 | Dessero |
| 2022/0413691 A1 | 12/2022 | Becker |
| 2023/0004216 A1 | 1/2023 | Rodgers et al. |
| 2023/0008537 A1 | 1/2023 | Henderson |
| 2023/0068660 A1 | 3/2023 | Brent |
| 2023/0069764 A1* | 3/2023 | Jonker .................... G06F 9/451 |
| 2023/0074080 A1 | 3/2023 | Miller |
| 2023/0093979 A1 | 3/2023 | Stauber |
| 2023/0133579 A1* | 5/2023 | Chang ..................... G06F 3/013 382/103 |
| 2023/0152935 A1 | 5/2023 | McKenzie |
| 2023/0154122 A1 | 5/2023 | Dascola |
| 2023/0163987 A1 | 5/2023 | Young |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244316 A1 | 8/2023 | Schwarz |
| 2023/0244857 A1 | 8/2023 | Weiss |
| 2023/0273706 A1 | 8/2023 | Smith |
| 2023/0274504 A1 | 8/2023 | Ren |
| 2023/0315385 A1 | 10/2023 | Akmal |
| 2023/0316634 A1 | 10/2023 | Shih-Sang |
| 2023/0325004 A1 | 10/2023 | Burns |
| 2023/0350539 A1 | 11/2023 | Owen |
| 2023/0384907 A1 | 11/2023 | Boesel |
| 2024/0086031 A1 | 3/2024 | Palangie |
| 2024/0086032 A1 | 3/2024 | Palangie |
| 2024/0087256 A1 | 3/2024 | Hylak |
| 2024/0094863 A1 | 3/2024 | Smith |
| 2024/0095984 A1 | 3/2024 | Ren |
| 2024/0103684 A1 | 3/2024 | Yu |
| 2024/0103707 A1 | 3/2024 | Henderson |
| 2024/0104836 A1 | 3/2024 | Dessero |
| 2024/0104877 A1 | 3/2024 | Henderson |
| 2024/0111479 A1 | 4/2024 | Paul |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2012234550 A | 11/2012 |

(56) References Cited

FOREIGN PATENT DOCUMENTS

| | | | |
|---|---|---|---|
| JP | 2013196158 | A | 9/2013 |
| JP | 2013257716 | A | 12/2013 |
| JP | 2014514652 | A | 6/2014 |
| JP | 2015515040 | A | 5/2015 |
| JP | 2015118332 | A | 6/2015 |
| JP | 2016194744 | A | 11/2016 |
| JP | 2017027206 | A | 2/2017 |
| JP | 2018005516 | A | 1/2018 |
| JP | 2019169154 | A | 10/2019 |
| JP | 2022053334 | A | 4/2022 |
| KR | 20160012139 | A | 2/2016 |
| KR | 20190100957 | A | 8/2019 |
| WO | 2019142560 | A1 | 7/2019 |
| WO | 2020066682 | A1 | 4/2020 |
| WO | 2021202783 | A1 | 10/2021 |
| WO | 2022055822 | A1 | 3/2022 |
| WO | 2022066399 | A1 | 3/2022 |
| WO | WO 2022046340 | | 3/2022 |
| WO | WO2022164881 | | 4/2022 |
| WO | 2023141535 | A1 | 7/2023 |

OTHER PUBLICATIONS

U.S. Patent and Trademark Office, Corrected Notice of Allowability received for U.S. Appl. No. 17/448,875, 4 pages, Apr. 24, 2024.
U.S. Patent and Trademark Office, Corrected Notice of Allowability received for U.S. Appl. No. 17/659,147, 6 pages, Feb. 14, 2024.
U.S. Patent and Trademark Office, Corrected Notice of Allowability received for U.S. Appl. No. 17/932,655, 2 pages, Oct. 12, 2023.
U.S. Patent and Trademark Office, Corrected Notice of Allowability received for U.S. Appl. No. 18/465,098, 3 pages, Mar. 13, 2024.
European Patent Office, European Search Report received for European Patent Application No. 21791153.6, 5 pages, Mar. 22, 2024.
European Patent Office, Extended European Search Report received for European Patent Application No. 23197572.3, 7 pages, Feb. 19, 2024.
U.S. Patent and Trademark Office, Final Office Action received for U.S. Appl. No. 17/580,495, 29 pages, May 13, 2024.
U.S. Patent and Trademark Office, Final Office Action received for U.S. Appl. No. 17/659,147, 17 pages, Oct. 4, 2023.
European Patent Office (ISA/EP), International Search Report received for International Patent Application No. PCT/US2021/071596, 7 pages, Apr. 8, 2022.
European Patent Office (ISA/EP), International Search Report received for International Patent Application No. PCT/US2022/071704, 6 pages, Aug. 26, 2022.
European Patent Office (ISA/EP), International Search Report received for PCT Patent Application No. PCT/US2023/074257, 5 pages, Nov. 21, 2023.
European Patent Office (ISA/EP), International Search Report received for International Patent Application No. PCT/US2023/074950, 9 pages, Jan. 3, 2024.
European Patent Office (ISA/EP), International Search Report received for International Patent Application No. PCT/US2023/074979, 6 pages, Feb. 26, 2024.
U.S. Patent and Trademark Office, Non-Final Office Action received for U.S. Appl. No. 17/659,147, 19 pages, Mar. 16, 2023.
U.S. Patent and Trademark Office, Non-Final Office Action received for U.S. Appl. No. 17/932,655, 10 pages, Apr. 20, 2023.
U.S. Patent and Trademark Office, Non-Final Office Action received for U.S. Appl. No. 17/932,999, 22 pages, Feb. 23, 2024.
U.S. Patent and Trademark Office, Non-Final Office Action received for U.S. Appl. No. 18/157,040, 25 pages, May 2, 2024.
U.S. Patent and Trademark Office, Notice of Allowance received for U.S. Appl. No. 17/448,875, 8 pages, Apr. 17, 2024.
U.S. Patent and Trademark Office, Notice of Allowance received for U.S. Appl. No. 17/448,876, 9 pages, Apr. 7, 2022.
U.S. Patent and Trademark Office, Notice of Allowance received for U.S. Appl. No. 17/448,876, 8 pages, Jul. 20, 2022.
U.S. Patent and Trademark Office, Notice of Allowance received for U.S. Appl. No. 17/659,147, 13 pages, Jan. 26, 2024.
U.S. Patent and Trademark Office, Notice of Allowance received for U.S. Appl. No. 17/932,655, 7 pages, Jan. 24, 2024.
U.S. Patent and Trademark Office, Notice of Allowance received for U.S. Appl. No. 17/932,655, 7 pages, Sep. 29, 2023.
U.S. Patent and Trademark Office, Notice of Allowance received for U.S. Appl. No. 18/154,757, 12 pages, May 10, 2024.
U.S. Patent and Trademark Office, Notice of Allowance received for U.S. Appl. No. 18/421,675, 9 pages, Apr. 11, 2024.
U.S. Patent and Trademark Office, Notice of Allowance received for U.S. Appl. No. 18/463,739, 10 pages, Feb. 1, 2024.
U.S. Patent and Trademark Office, Notice of Allowance received for U.S. Appl. No. 18/463,739, 11 pages, Oct. 30, 2023.
U.S. Patent and Trademark Office, Notice of Allowance received for U.S. Appl. No. 18/465,098, 6 pages, Mar. 4, 2024.
U.S. Patent and Trademark Office, Notice of Allowance received for U.S. Appl. No. 18/465,098, 8 pages, Nov. 17, 2023.
National Intellectual Property Administration of the People's Republic of China, Search Report (with English translation) received for Chinese Patent Application No. 202310873465.7, 5 pages, Feb. 1, 2024.
"AquaSnap Window Manager: dock, snap, tile, organize," Nurgo Software, Available online at: https://www.nurgo-software.com/products/aquasnap, 5 pages, retrieved on Jun. 27, 2023.
United States Patent and Trademark Office, Corrected Notice of Allowance, U.S. Appl. No. 17/478,593, 2 pages, Dec. 21, 2022.
European Patent Office, Extended European Search Report, European Patent Application No. 23158818.7, 12 pages, Jul. 3, 2023.
European Patent Office, Extended European Search Report, European Patent Application No. 23158929.2, 12 pages, Jun. 27, 2023.
U.S. Patent and Trademark Office, Final Office Action, U.S. Appl. No. 17/448,875, 24 pages, Mar. 16, 2023.
Home | Virtual Desktop, Virtual Desktop, https://www.vrdesktop.net, 4 pages, retrieved Jun. 29, 2023.
European Patent Office (ISA/EP), International Search Report, International Application No. PCT/US2022/076603, 4 pages, Jan. 9, 2023.
European Patent Office (ISA/EP), International Search Report, International Application No. PCT/US2023/017335, 6 pages, Aug. 22, 2023.
European Patent Office (ISA/EP), International Search Report, International Application No. Application No. PCT/US2023/018213, 6 pages, 2023-2079-26.
European Patent Office (ISA/EP), International Search Report, International Application No. PCT/US2023/019458, 7 pages, Aug. 8, 2023.
European Patent Office (ISA/EP), International Search Report, International Application No. PCT/US2023/060943, 7 pages, Jun. 6, 2023.
European Patent Office (ISA/EP), International Search Report, International Application No. PCT/US2021/050948, 6 pages, Mar. 4, 2022.
European Patent Office. International Search Report, International Application No. PCT/US2021/065240, 6 pages, May 23, 2022.
European Patent Office, International Search Report, International Application No. PCT/US2021/071595, 7 pages, Mar. 17, 2022.
European Patent Office, International Search Report, International Application No. PCT/US2022/013208, 7 pages, Apr. 26, 2022.
European Patent Office, International Search Report, International Application No. PCT/US2021/065242, 3 pages, Apr. 4, 2022.
U.S. Patent and Trademark Office, Non-Final Office Action, U.S. Appl. No. 17/448,875, 25 pages, Oct. 6, 2022.
U.S. Patent and Trademark Office, Non-Final Office Action, U.S. Appl. No. 17/448,875, 30 pages, Sep. 29, 2023.
U.S. Patent and Trademark Office, Non-Final Office Action, U.S. Appl. No. 17/580,495, 27 pages, Dec. 11, 2023.
U.S. Patent and Trademark Office, Notice of Allowance, U.S. Appl. No. 17/478,593,, 10 pages, Aug. 31, 2022.
U.S. Patent and Trademark Office, Notice of Allowance, U.S. Appl. No. 17/580,495,, 6 pages, Jun. 6, 2023.
U.S. Patent and Trademark Office, Notice of Allowance, U.S. Appl. No. 17/580,495, 12 pages, Nov. 30, 2022.

(56) References Cited

OTHER PUBLICATIONS

U.S. Patent and Trademark Office, Notice of Allowance, U.S. Appl. No. 18/154,757, 10 pages, Jan. 23, 2024.

U.S. Patent and Trademark Office, Restriction Requirement, U.S. Appl. No. 17/932,999, 6 pages, Oct. 3, 2023.

Bhowmick, S, "Explorations on Body-Gesture Based Object Selection on HMD Based VR Interfaces for Dense and Occluded Dense Virtual Environments," Report: State of the Art Seminar, Department of Design Indian Institute of Technology, Guwahati, 25 pages, Nov. 2018.

Bolt, R.A et al.,, "Two-Handed Gesture in Multi-Modal Natural Dialog," Uist '92, 5th Annual Symposium on User Interface Software And Technology. Proceedings Of the ACM Symposium on User Interface Software And Technology, Monterey, pp. 7-14, Nov. 1992.

Brennan, D., "4 Virtual Reality Desktops for Vive, Rift, and Windows VR Compared," Road to VR, Available online at: https://www.roadtovr.com/virtual-reality-desktop-compared-oculus-rift-htc-vive/, 4 pages, retrieved on Jun. 29, 2023.

Camalich, S., "CSS Buttons with Pseudo-elements," available online at: https://tympanus.net/codrops/2012/01/11/css-buttons-with-pseudo-elements/, 8 pages, retrieved on Jul. 12, 2017.

Chatterjee, I. et al., "Gaze+Gesture: Expressive, Precise and Targeted Free-Space Interactions," ICMI '15, 8 pages, 2015.

Lin, J. et al., "Towards Naturally Grabbing and Moving Objects in VR," IS&T International Symposium on Electronic Imaging and The Engineering Reality of Virtual Reality, 6 pages, 2016.

McGill, M et al., "Expanding The Bounds Of Seated Virtual Workspaces," University of Glasgow, Available online at: https://core.ac.uk/download/pdf/323988271.pdf, 44 pages, retrieved on Jun. 27, 2023.

Pfeuffer, K. et al., "Gaze + Pinch Interaction in Virtual Reality," In Proceedings of SUI '17, Brighton, United Kingdom, pp. 99-108, 2017.

European Patent Office, International Search Report issued Dec. 21, 2021, which pertains to PCT Application No. PCT/US2021/049131, filed Sep. 3, 2021. 4 pgs.

European Patent Office, Written Opinion issued Dec. 21, 2021, which pertains to PCT Application No. PCT/US2021/049131, filed Sep. 3, 2021. 9 pgs.

* cited by examiner

USER INTERFACE RESPONSE BASED ON GAZE-HOLDING EVENT ASSESSMENT

CROSS-REFERENCE TO RELATED APPLICATIONS

This application claims the benefit of U.S. Provisional Application Ser. No. 63/409,147 filed Sep. 22, 2022, and which claims the benefit of U.S. Provisional Patent Application No. 63/453,506 filed Mar. 21, 2023, each of which is incorporated by reference herein in its entirety.

TECHNICAL FIELD

The present disclosure generally relates to assessing user interactions with electronic devices that involve gaze-based and other types of user activities.

BACKGROUND

Existing user interaction systems may be improved with respect to facilitating interactions based on gaze and other types of user activities.

SUMMARY

Various implementations disclosed herein include devices, systems, and methods that assess user interactions to trigger user interface responses. In some implementations, a user interface response is triggered based on identifying a gaze-holding event (i.e., a fixation-like gaze event that is not associated with saccadic behavior). Gaze-holding events (and thus not saccade-related behaviors in the gaze data) (or acceptable portions thereof) may be used to trigger user interface responses. Using gaze-holding events to trigger user interface behavior may be advantageous, for example, because gaze directions during gaze-holding events may be more likely to correspond to a user perceiving what they are seeing and/or intentionally looking at something.

Using gaze-holding events can facilitate accurate gaze-based hover responses. For example, the user interface may be enabled to highlight a user interface icon when a user intentionally looks at the icon (e.g., similar to a mouse-hover response on a mouse-based user interface), while not highlighting the icon when the user's gaze happens to move over the icon while the user is glancing around within the user interface. Similarly, using gaze-holding events can facilitate accurate gesture-to-gaze association-based input responses. In one example, this involves associating single hand gestures, such as a pinches, gestures spreading of all five fingers on one hand, or multi-finger swipe gestures, with users intentionally gazing at user interface (UI) objects, while not associating such activities with objects that happen to be gazed upon during saccade-related or other unintentional behaviors. In another example, this involves associating multi-hand gestures, such as both hands pinching at the same time or the hands moving away from one another, with users intentionally gazing at UI objects, while not associating such activities with objects that happen to be gazed upon during saccade-related or other unintentional behaviors. In another example, this involves associating head movement, such as nodding, shaking, or tilting of the head, with users intentionally gazing at UI objects, while not associating such activities with objects that happen to be gazed upon during saccade-related or other unintentional behavior. In some implementations, a gaze is associated with one or more of a hand gesture, head gesture, torso-based gesture, arm gesture, leg gesture, or whole-body movement (e.g., associating a gaze with a combined hand/head gesture). A gaze may additionally, or alternatively, be associated with input provided via a physical device, such as a keyboard, mouse, hand-held controller, watch, etc.

In some implementations, gaze-holding events are used to associate a non-eye-based user activity, such as a hand or head gesture, with an eye-based activity, such as the user gazing at a particular user interface component displayed within a view of a three-dimensional (3D) environment. For example, a user's pinching hand gesture may be associated with the user gazing at a particular user interface component, such as a button, at around the same time (e.g., within a threshold amount of time of) as the pinching hand gesture is made. These associated behaviors (e.g., the pinch and the gaze at the button) may then be interpreted as user input (e.g., user input selecting or otherwise acting upon that user interface component). In some implementations, non-eye-based user activity is only associated with certain types of eye-based user activity that are likely to correspond to a user perceiving what they are seeing and/or intentionally looking at something. For example, it may be desirable to associate a user hand gesture with gaze-holding events corresponding to intentional/perceptive user activity. Gaze-holding events occur while a gaze holds on an object while the head is static or moving. It may be undesirable to associate a user hand gesture with a saccadic eye event that may occur reflexively rather than based on a user perceiving what they see or intentionally looking at something.

Gaze data may be examined or interpreted to identify gaze-holding events (e.g., non-saccadic eye events). The non-eye-based user activity may then be associated with one of those events, rather than being associated with a reflexive, saccadic eye event. During a saccadic event, for example, a user may look away from the user interface element that they intend to interact with for a brief period. Some implementations, ensure that non-eye-based activity (e.g., a user's hand gesture) is not associated with a saccadic event or other gaze event during which the user's gaze does not accurately correspond to the user interface or other content with which the user intends to interact.

In some implementations, eye gaze data (e.g., eye velocity data, eye acceleration data, change in gaze pose, etc.) is used to identify a subset of gaze events that only includes gaze-holding events and that excludes reflexive, saccadic events, blinks, and other eye behavior that does not correspond to a user perceiving what they are seeing and/or intentionally looking at something. Excluding saccadic events, blinks, and other eye behavior that does not correspond to a user perceiving what they are seeing and/or intentionally looking at something may improve the accuracy and/or efficiency of a system that attempts to accurately associate non-eye-based user activity with intentional user gazing (i.e., intentionally gazing at a user interface component for the purpose of providing user input corresponding to that user interface component). Thus, in some implementations, user non-eye-based activities, such as hand gestures, are only associated with gaze-holding events based on the events being more likely than non-gaze-holding events to correspond to a user perceiving what they are seeing and/or intentionally looking at something.

In some implementations, a processor performs a method by executing instructions stored on a (e.g., non-transitory) computer readable medium. The method obtains gaze motion classification data that was generated based on sensor data of an eye captured by the one or more sensors. The gaze motion classification data distinguishes gaze periods associated with gaze-holding events (e.g., intentional fixations on user interface targets) from gaze periods associated with non-gaze-holding events (e.g., gaze shifting events, blink/loss events, etc.). The gaze motion classification data may be provided by a simple gaze motion classifier (e.g., a heuristic algorithm that assesses only gaze velocity, or a more complex algorithm or machine learning model that uses more than gaze velocity). Using the gaze motion classification data may facilitate triggering user interface responses only in appropriate circumstances (e.g., only based on fixations on intentional fixations on user interface targets and not based on unintentional gaze motion (e.g., saccades, blinks, etc.)). In some implementations, gaze classification output (e.g., identifying gaze-holding events) is assessed to lock gaze during saccade, loss, and fast fixations and/or stabilize the gaze during fixation.

The method may use gaze classification data that is generated based on a gaze velocity at multiple times. The gaze data may be obtained based on sensor data of an eye captured by the sensor. For example, the gaze data may be based on a signal of live gaze velocity data obtained based on a stream of live images of the eye captured by an inward facing camera of a head-mounted device.

The gaze-holding events may be identified based on the gaze velocity. Saccadic gaze events, blinks, and/or other eye events unlikely to correspond to a user perceiving what they are seeing and/or intentionally looking at something may be excluded from the identified gaze-holding events.

The method includes detecting a user activity and triggering a user interface response based on the user activity and the gaze motion classification data. The method may include triggering a user interface response based on determining that a gaze-holding event of the gaze-holding events corresponds to a user interface element. For example, based on a gaze-holding event having a gaze direction directed at a particular user interface icon, the method may include triggering a hover-type response by the user interface (e.g., highlighting that icon as a "hovered" or "in focus" element of the user interface). In some implementations, the user activity is a gaze in a gaze direction occurring during a gaze-holding event and the user interface response comprises providing an indication of user attention to the user interface element based on determining that the gaze-holding event corresponds to the user interface element. Note that a gaze direction may correspond to a gaze direction of a single eye or a gaze direction determined based on both eyes. In one example, a gaze direction of a user's dominant eye is used in assessing user activity and triggering user interface responses.

In some implementations, the user activity is a gesture or input device interaction distinct from the gaze, the gaze-holding event is associated with the user activity, and the user interface response is triggered based on associating the user activity with the user interface element. For example, based on a gaze-holding event being directed at a particular user interface icon and an occurrence of a user activity (e.g., a pinch gesture) that is associated with the gaze-holding event, the method may include triggering a selection-type response by the user interface (e.g., triggering a selection or "clicked on" action on the user interface icon).

The method may include detecting that user activity has occurred, where the activity is distinct from the gaze-holding events (e.g., is a non-eye-based eye activity such as a pinch or other hand gesture). Examples of activity distinct from the gaze-holding events include activities that are separate from the eye, including, but not limited to, single hand gestures, multi-hand gestures, head movements, torso movements, movements of arms or legs, whole body movements, and/or interactions with other devices.

The method may include associating a gaze-holding event with the activity. Accordingly, in various implementations, a gaze-holding event is associated with one or more of a gesture made by a single hand, a gesture that involves one or more fingers, a gesture made by multiple hands, a gesture made by a head, a gesture made by hand and head positions/movements made at approximately the same time, and/or inputs to a device such as a controller, input device, wearable device, or hand-held device.

In some implementations, the method includes determining that a gaze-holding (e.g., non-saccadic) event occurred during/simultaneously with the activity (e.g., pinch) and, based on this determination, associating the gaze-holding event with the activity. Thus, a pinch that occurs while a user's gaze is associated with a button (e.g., fixed on or around a button) may be associated with that button (e.g., associating the pinch with the gazed-upon button). In some implementations, the method includes determining that a gaze-holding (e.g., non-saccadic) event did not occur during/simultaneously with the activity (e.g., pinch) and includes determining whether the activity is a valid late activity (e.g., a valid late pinch). This may be based on determining whether the late activity occurred within a threshold time of a prior gaze-holding (e.g., non-saccadic) event and, if so, associating the activity with that prior gaze-holding event. In some implementations, if no gaze-holding (e.g., non-saccadic) event occurs during/simultaneously with the activity or prior within the time threshold, then the method includes waiting to see if a gaze-holding occurs within an upcoming time period. If a new gaze-holding does occur within such a period (e.g., within a threshold time), then the method may include associating the activity with that new gaze-holding. In these examples, a non-eye-based activity, such as a pinch, that occurs during a saccade is not associated with the saccade (which is not a gaze-holding event). Instead, the non-eye-based activity, such as a pinch, may be associated with a prior or upcoming non-saccadic gaze-holding event. The associating of a non-eye-based activity with a gaze-holding event may identify an object associated with the event, such as a user interface target at which the gaze of the identified gaze-holding event is directed. Thus, the user's non-eye-based activity (e.g., pinch) can be associated with user interface components and other objects. In some implementations, content is presented to appear with in a 3D environment such as an extended reality (XR) environment, and the techniques disclosed herein are used to identify user interactions with user interface and/or other content within that 3D environment.

In some implementations, the user interface response is based on user activity (e.g., a large saccade), where the response ignores/does not use a gaze-holding event that follows the large saccade event. In one example, the user activity is a saccadic event having a characteristic that exceeds a threshold and the user interface response is based on excluding a potential gaze-holding event or a portion of a gaze-holding event occurring during a time period following the saccadic event. In some implementations, identifying a gaze-holding events comprises excluding a potential gaze-holding event or a portion of gaze-holding event occurring during a time period following a saccadic event in the velocity data, wherein the potential gaze-holding event is excluded based on: (a) an amplitude representing velocity change during saccadic event; (b) a rate of change of velocity during the saccadic event; (c) a duration of the potential gaze-holding event; or (d) gaze travel distance.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
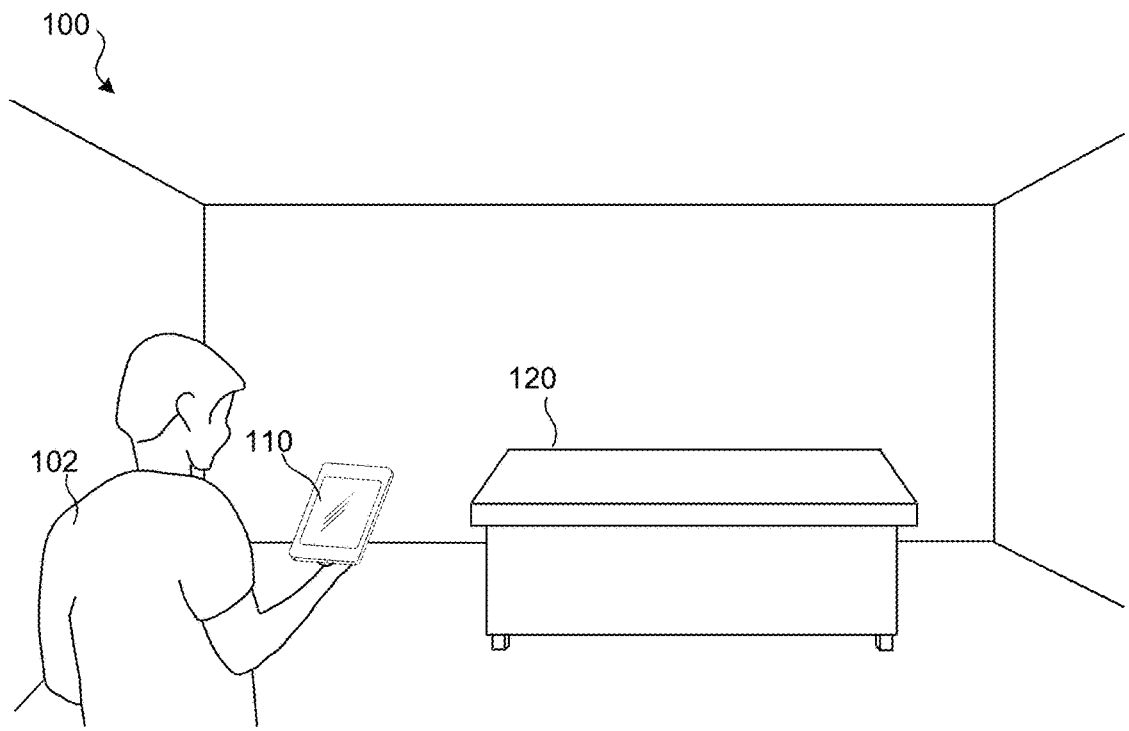
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120. The electronic device 110 includes one or more cameras, microphones, depth sensors, or other sensors that can be used to capture information about and evaluate the physical environment 100 and the objects within it, as well as information about a user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

In some implementations, a user interface response provided by device 110 is triggered based on identifying a gaze-holding event (i.e., a fixation-like gaze event that is not associated with saccadic behavior) based on gaze velocity. Using gaze-holding events can facilitate accurate gaze-based hover responses. For example, the device 110 may be enabled to highlight a user interface icon when a user intentionally looks at the icon, while not highlighting the icon when the user's gaze happens to move over the icon while the user is glancing around within the user interface. Similarly, using gaze-holding events, the device 110 can facilitate accurate pinch-and-gaze association-based input responses (e.g., associating pinch activities with users intentional gazing at user interface objects while not associating pinch activities with objects that happen to be gazed upon during saccade-related behaviors).

Figure 2:
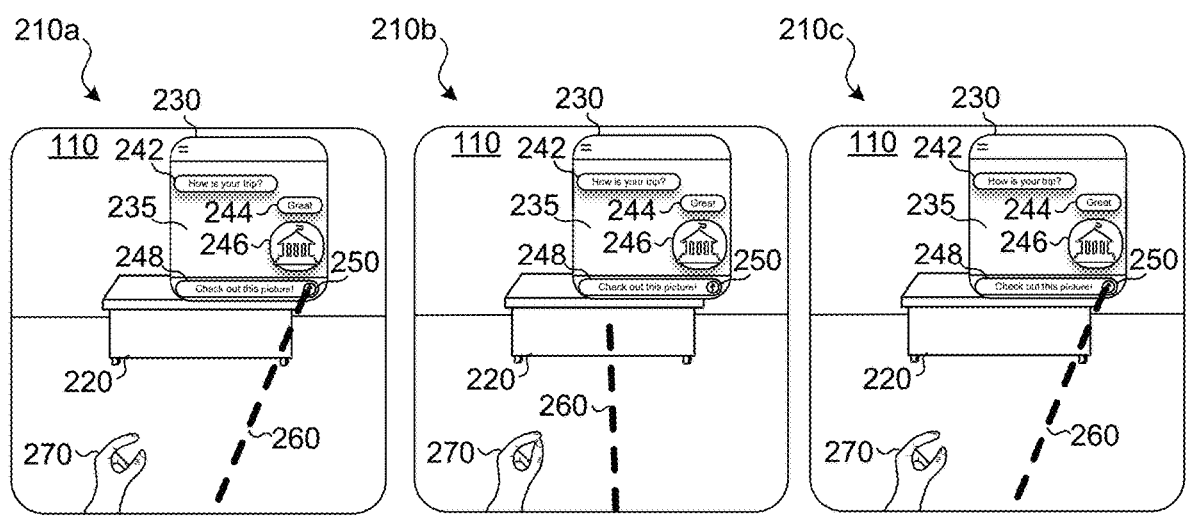
FIG. 2 illustrates the user making a pinching gesture while changing gaze direction relative to content presented in views of an XR environment provided by the device 110 of FIG. 1, in accordance with some implementations.

FIG. 2 illustrates the user 102 making a pinching hand gesture while changing gaze direction relative to content presented in views 210a-c of an XR environment provided by the device 110 of FIG. 1. The views 210a-c include an exemplary user interface 230 of an application and a depiction 220 (e.g., a representation, optionally visible via the display of the device 110) of the desk 120. Providing such a view may involve determining 3D attributes of the physical environment 100 and positioning virtual content, e.g., user interface 230, in a 3D coordinate system corresponding to that physical environment 100.

In the example of FIG. 2, the user interface 230 include various content items, including a background portion 235, message bubble portions, 242, 244, 246, and a new message entry portion 248 with button 250. The message bubble portions 242, 244, 246 may be displayed on the flat (e.g., two-dimensional (2D)) user interface 230 with 3D effects in the view provided by device 110. The user interface 230 may be a user interface of a text messaging application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the user interface 230 is provided in a way that combines 2D flat portions and 3D effects to provide functional and aesthetic benefits. In this example, the background portion 235 of the user interface 230 is flat. In this example, the background portion 235 includes all aspects of the user interface 230 being displayed except for the message bubbles 242, 244, 246 and new message entry portion 248 with button 250. Displaying a background portion of a user interface of an operating system or application as a flat surface may provide various advantages. Doing so may provide an easy to understand or otherwise easy to use portion of an XR environment for accessing the user interface of the application. In some implementations, multiple user interfaces (e.g., corresponding to multiple, different applications) are presented sequentially and/or simultaneously within an XR environment using flat background portions.

In some implementations, the positions and/or orientations of such one or more user interfaces are determined to facilitate visibility and/or use. The one or more user interfaces may be at fixed positions and orientations within the 3D environment. In such cases, user movements would not affect the position or orientation of the user interfaces within the 3D environment.

In other implementations, the one or more user interfaces may be body-locked content (e.g., having a distance and orientation offset that are fixed relative to a portion of the user's body (e.g., their torso)). For example, the body-locked content of a user interface could be 2 meters away and 45 degrees to the left of the user's torso's forward-facing vector. If the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and be repositioned within the 3D environment such that it is still 2 m away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, a body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

The views 210*a-c* illustrate the user's gaze 260 and hand 270 gesturing occurring at successive points in time (e.g., view 210*a* corresponds to a first instant in time, view 210*b* corresponds to a second instant in time after the first instant in time, and view 210*c* corresponds to a third instant in time after the second instant in time). In this example, during the period of time from the first instant in time to the third instant in time, the user intends to provide user input selecting button 250 by gazing at the button 250 (i.e., directing their gaze direction 260 at button 250) while simultaneously (e.g., within a threshold amount of time of) making a pinching gesture with hand 270. The user understands that this type of input (e.g., simultaneously gazing at a user interface object such as button 250 while making a pinching hand gesture) will be interpreted as input corresponding to the gazed-at user interface object.

However, while attempting to do so, in this example, the user 102 experiences an involuntary saccade, looking away from the button 250 at the second instant in time when the pinch occurs. Thus, at the first instant in time illustrated in view 210*a*, the user 102 has not yet pinched and is gazing at the button 250. At the second instant in time illustrated in view 210*b*, the user 102 has pinched hand 270 but the involuntary, reflexive saccade occurs and thus the gaze 260 is directed at the depiction 220 of the desk 120 rather than at the button 250. This gaze direction does not correspond to the user's intent or what the user is perceiving. At the third instant in time illustrated in view 210*c*, the user 102 is no longer pinching hand 270 and the saccade has ended with the gaze 260 returning to the button 250.

Some implementations disclosed herein assess user gaze data (e.g., gaze velocity, to identify types of eye events that should be associated with non-eye-based activity versus types of eye events that should not be associated with non-eye-based activity). Some implementations, attempt to distinguish gaze-holding events (i.e., eye gaze events associated with a user intentionally gazing at an object and/or perceiving what they are seeing) from other gaze events (e.g., saccades, blinks, etc.) in which the user in not intentionally gazing at an object and/or perceiving what they are seeing.

In the example of FIG. 2, the user's gaze data (e.g., gaze velocity data), may be assessed to determine that at the second instant in time (illustrated in view 210*b*) while the pinch occurs there is no gaze-holding event (e.g., the gaze event that occurs at the second instant in time is instead a saccadic gaze event).

Based on determining that the pinch did not occur during/simultaneously with a gaze-holding event, the device 110 may attempt to associate the pinch with a prior or future gaze-holding event. For example, the device 110 may determine that the pinch (at the second instant in time illustrated in view 210*b*) occurred within a predetermined threshold amount of time following an identified gaze-holding event (e.g., occurring at the first instant in time illustrated in view 210*a*). For example, the threshold may be a 1 ms, 2 ms, 10 ms, 50 ms, etc. threshold. If the first instant in time (illustrated in view 210*a*) and the second instant in time (illustrated in view 210*b*) occurred within 1 ms, 2 ms, 10, ms, etc. of one another, then the pinch occurring at the second instant in time (illustrated in view 210*b*) is associated with the gaze-holding event (i.e., the user 102 gaze direction 260 being directed to button 250) at the first instant in time (illustrated in view 210*a*).

If, on the other hand, the first instant in time (illustrated in view 210*a*) and the second instant in time (illustrated in view 210*b*) do not occur within the threshold (e.g., 1 ms, 2 ms, 10, ms, etc.) of one another, then the pinch occurring at the second instant in time (illustrated in view 210*b*) is not associated with the gaze-holding event that occurred at the first instant in time (illustrated in view 210*a*). If no prior gaze-holding event occurred within the threshold amount of time, then the device 110 may wait as new gaze data is received and assess such data to determine if a new gaze event occurs following the pinch that occurred at the second instant in time (illustrated in view 210*b*). For example, the device 110 may determine that the pinch (at the second instant in time illustrated in view 210*b*) occurred within a predetermined threshold amount of time before an identified gaze-holding event (e.g., occurring at the third instant in time illustrated in view 210*c*). For example, the threshold may be a 1 ms, 2 ms, 10 ms, 50 ms, etc. threshold. If the third instant in time (illustrated in view 210*c*) and the second instant in time (illustrated in view 210*b*) occurred within 1 ms, 2 ms, 10, ms, etc. of one another, then the pinch occurring at the second instant in time (illustrated in view 210*b*) is associated with the gaze-holding event (i.e., the user 102 gaze direction 260 being directed to button 250) at the third instant in time (illustrated in view 2*c*). The threshold amounts of time used to assess prior gaze-holding events or wait for new gaze-holding events may be the same or may be different from one another.

If no new gaze-holding event occurs within the threshold amount of time, then the device 110 may determine that the pinch occurring at that second instant in time (illustrated in view 210*b*) should not be associated with any gaze events. In other words, if no valid gaze-holding event occurs in a window of time before and after a given non-eye-based user activity, the device 110 may determine to not associate that activity with any eye-based activity. The non-gaze-based activity (e.g., a pinch) may still be interpreted as input, but will not be associated with a gaze event/direction. In some implementations, a given input type (e.g., a pinch) is interpreted a first way when associated with an eye-based event and another way when not associated with an eye-based event (e.g., the device 110 performs an alternative action or forgoes performing any action). In some implementations, a non-eye-based activity, such a pinch, is not treated as input unless associated with a gaze event. In some implementations, device 110 presents visual or audible output asking the user 102 for clarification or further input when a non-eye-based activity cannot be associated with a valid gaze-holding event/user interface object.

Note that in some implementations a pinch is determined to occur when a pinch is made (e.g., when the fingers first make contact). In some implementations a pinch is released (e.g., when the fingers separate from one another). In some implementations, a pinch occurs during a period of time during which fingers are touching (e.g., the period between when the fingers first make contact and when the fingers separate from one another). Various implementations disclosed herein may associate a gaze-holding event with a pinch that is determined to occur based on gaze activity at the time at which a pinch is initially made, the period during which the fingers are touching, and/or the time at which the fingers separate.

Figure 3A:
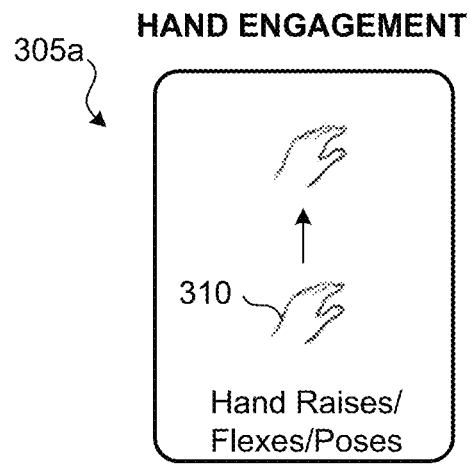
FIGS. 3A, 3B, and 3C illustrate hand engagement, indirect selection, and indirect gestures based on hand and gaze, in accordance with some implementations.
Figure 3B:
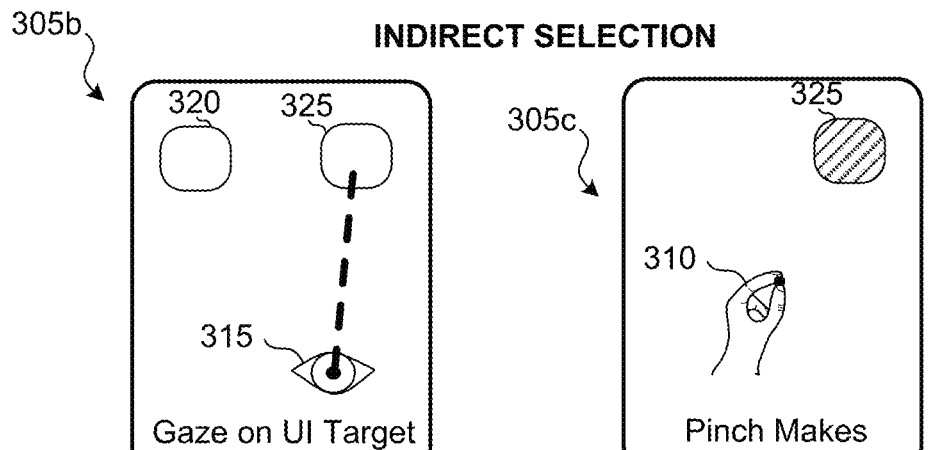
Figure 3C:
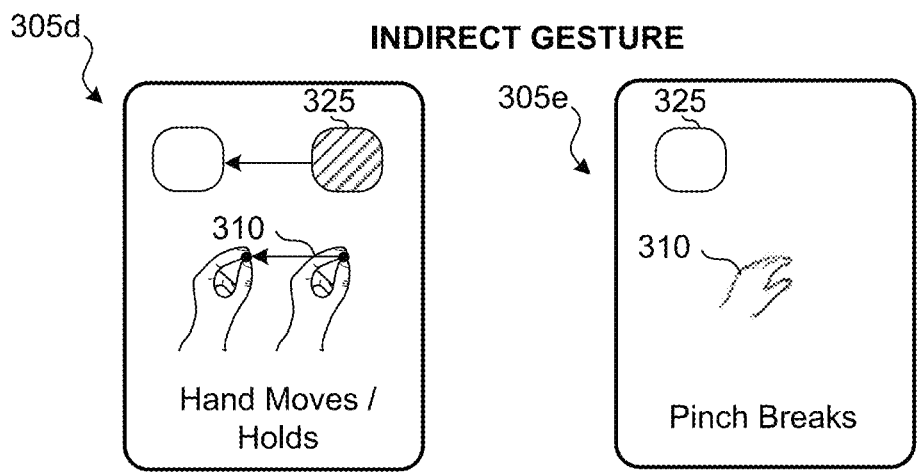

FIGS. 3A, 3B, and 3C illustrate hand engagement, indirect selection, and indirect gestures based on hand and gaze.

In FIG. 3A, illustration 305*a* illustrates a hand engagement user input in which a user provides input by simply raising/moving hand 310. In this example, the hand engagement user input is treated as input without requiring and/or using any associated gaze or other eye data.

Such hand gestures may be recognized by a device using one or more sensors of various types. For example, an image sensor may capture a sequence of images that may be interpreted to identify an object (e.g., hand) and its movement path, configuration (e.g., whether fingers are touching/pinching or not), etc.

In FIG. 3B, illustrations 305b-c illustrate an indirect selection. Illustration 305b illustrates a user eye 315 gazing at a user interface object 325, which is one of two user interface objects 320, 325 that are visible to the user in this example. In illustration 305c, the user makes a pinch gesture with hand 310 to identify or otherwise select the user interface object 325. The user interface object 325 is identified or otherwise selected based on the pinch being associated with the gaze at that user interface object 325 as shown in illustration 305b. The association of the pinch of illustration 305c with the gaze (and its associated user interface object) of illustration 305b can be based on various association criteria. For example, the pinch and gaze/UI object may be associated based on the pinch and gaze occurring at the same time. In another example, the pinch and gaze/UI object may be associated based on the gaze occurring within a predetermined threshold amount of time prior to or after the pinch.

In the example of FIG. 3B, user interface object 325 is graphically changed (e.g., with highlighting, a different color, etc.) to illustrate that the object was selected based on the indirect selection input recognized based on the user's gaze. In other words, the selected user interface object 325 is determined to have been selected based on a change to its appearance. In some implementations, a gaze-holding event is used to trigger a user interface response that is analogous to a traditional mouse-based hover user interface response. In some implementations, gaze direction alone (i.e., prior to or without a pinch being received) is used to trigger a user interface response. A gaze-holding event may be identified and used to trigger such a user interface response. For example, a gaze-holding event may be recognized, the user interface target at which the gaze is directed (e.g., user interface element 325) may be identified based on the gaze direction during the gaze-holding event, and the user interface modified with a response corresponding to recognizing that the user is intentionally looking at that user interface target (e.g., by highlighting user interface element 325).

The user's gaze may additionally, or alternatively, be associated with a gesture as illustrated in FIG. 3B. In some implementations, a gaze-holding event is used to trigger a user interface response that is analogous to a traditional mouse-based click/selection user interface response. In some implementations, gaze direction along with a user gesture is used to trigger a user interface response. A gaze-holding event may be identified, associated with the user gesture, and the combined gaze-gesture input combination may be used to trigger such a user interface response. For example, a gaze-holding event may be recognized, a gesture may be associated with that gaze-holding event (e.g., based on occurring at or around the same time), the user interface target at which the gaze is directed (e.g., user interface element 325) may be identified based on the gaze direction during the gaze-holding event, and the user interface may be modified with a response corresponding to recognizing that the user is intentionally looking at that user interface target at (or around) the time the user provides the gesture (e.g., by triggering a selection of the user interface element 325 and/or a change in the appearance of user interface element 325, etc.).

The eye and hand activities of FIG. 3B can be detected based on one or more sensors. For example, eye activity may be detected based on an inward facing camera of a head mounted device (HMD) while the hand activity may be detected based on an outward facing camera on the HMD.

In FIG. 3C, illustrations 305d-e illustrate an indirect gesture. Illustration 305d shows a hand gesture in which the user moves the hand 310 left while pinching (i.e., the pinch/touching fingers are maintained during the movement). In this example, the pinch illustrated in illustration 305c is maintained as illustrated in illustration 305d. In other words, as the pinch is made (i.e., the fingers come together and touch), the pinch based on that instant in time is associated with a user interface element 325, which is selected based on that pinch and gaze association (shown in FIG. 3B), and the continuing/ongoing pinch in which the finger and thumb remain touching is then interpreted as additional input as illustrated in illustration 305d of FIG. 3C. In illustration 305d, the hand engagement user input is treated as input without requiring and/or using any associated gaze or other eye data. The input is simply the movement of hand 310 in a leftward direction.

Based on this activity, the selected user interface object 325 is moved. In this example, the direction and distance that the selected user interface object moves are based on the direction and distance that the hand moves. In some implementations, the direction of user interface object movement is constrained to a direction on a defined 2D plane (e.g., a direction on the 2D plane upon which user interface elements are displayed such as on a virtual screen a few feet in front of the user). For example, the direction of the UI object movement may be constrained to a direction that most closely corresponds to the 3D direction of the hand's movement. In some implementations, the amount of movement/distance is scaled (e.g., 1 inch of hand movement corresponds to 2 inches of UI object movement, 4 inches of UI object movement, 1 foot of UI object movement, etc.).

In illustration 305e, the user breaks (e.g., releases) the pinch that was made in illustration 305c and maintained during the movement of illustration 305d. In illustration 305e, the hand engagement user input (breaking the pinch) is treated as input without requiring and/or using any associated gaze or other eye data. The input is simply the separation of the fingers that had been pinched together. In this example, the pinch break of illustration 305e is interpreted as ending the movement of the UI object 325 (i.e., the UI object 325 stops moving based on the movement of the hand once the pinch is broken, even if the hand continues moving (e.g., leftward)). In this example, gaze may not be used during release of a pinch. In other examples, gaze (e.g., identification of gaze-holding events) may be used during pinch release, for example, to identify a position on a user interface at which an action is to be associated.

The hand gestures of illustrations 305d-e may be recognized by a device using one or more sensors of various types. For example, an image sensor may capture a sequence of images that may be interpreted to identify an object (e.g., hand) and its movement path, configuration (e.g., when fingers touch/pinch, when fingers stop touching/pinching), etc.

Figure 4A:
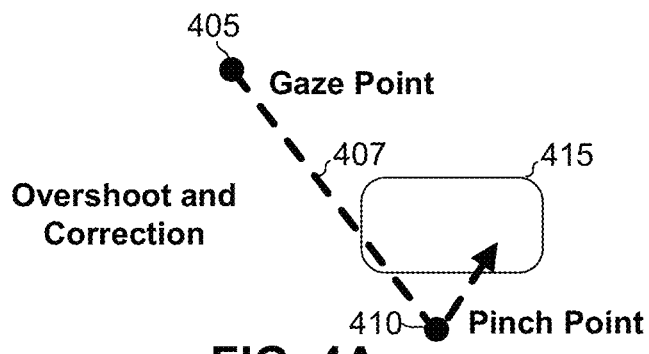
FIGS. 4A, 4B, 4C, and 4D illustrate various anomalies associated with a user's gaze direction relative to a user interface element, in accordance with some implementations.

FIGS. 4A, 4B, 4C, and 4D illustrate various anomalies associated with a user's gaze direction relative to a user interface element. In FIG. 4A, a gaze direction changes from gaze point 405 along path 407 relative to a user interface object 415 with which the user intends to interact (i.e., to pinch while gazing as pinch-plus-gaze input). In this example, the user's gaze overshoots (e.g., travels over and beyond) the user interface object 415 such that the pinch occurs at pinch point 410, while the user's gaze is outside of (e.g., does not overlap with) the user interface object 415.

Figure 4B:
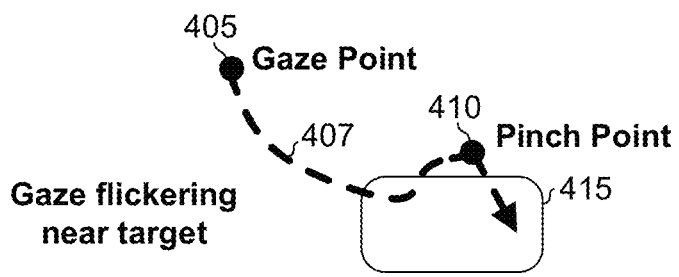

In FIG. 4B, the gaze direction changes from gaze point 405 along path 407 relative to a user interface object 415 with which the user intends to interact (i.e., to pinch while gazing as pinch-plus-gaze input). In this example, the user's gaze flickers (e.g., moves briefly outside of the target and then returns to the target) near the target user interface object 415 such that the pinch occurs at pinch point 410, while the user's gaze is outside of the user interface object 415.

Figure 4C:
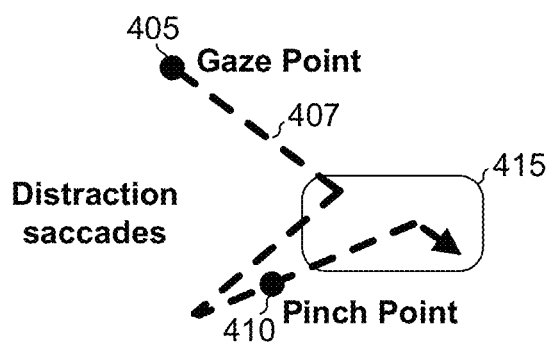

In FIG. 4C, the gaze direction changes from gaze point 405 along path 407 relative to a user interface object 415 with which the user intends to interact (i.e., to pinch while gazing as pinch-plus-gaze input). In this example, the user's gaze is subject to a saccade such that the pinch occurs at pinch point 410, while the user's gaze is outside of the user interface object 415.

Figure 4D:
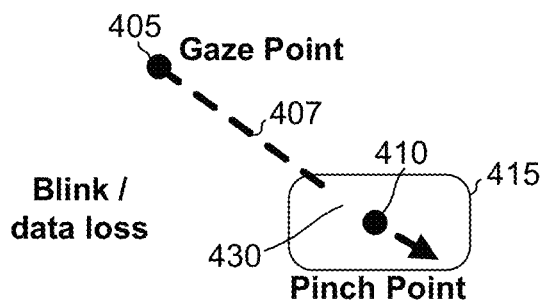

In FIG. 4D, the gaze direction changes from gaze point 405 along path 407 relative to a user interface object 415 with which the user intends to interact (i.e., to pinch while gazing as pinch-plus-gaze input). In this example, a blink/data loss gaze event 430 occurs such that the pinch occurs at pinch point 410, while the user's gaze direction is unknown.

Figure 5:
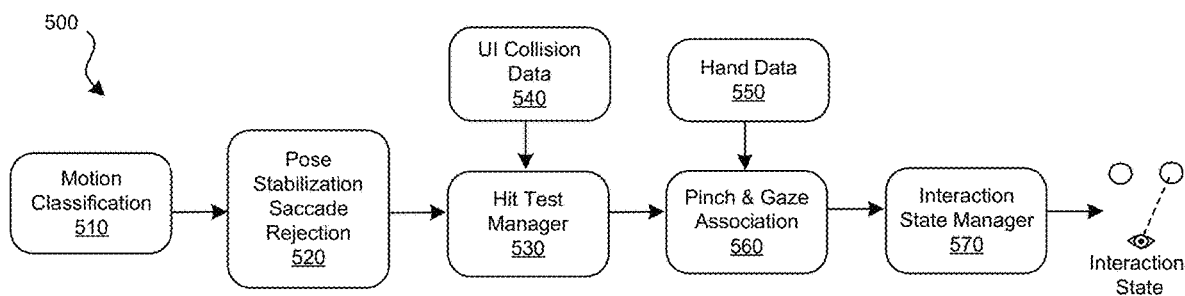
FIG. 5 illustrates an exemplary interaction tracking flow in accordance with some implementations.

FIG. 5 illustrates an exemplary interaction tracking flow 500. In this example, at motion classification block 510, eye gaze data is classified into events of different classification types. This may involve an algorithm or machine learning model that processes gaze data (e.g., a series of gaze direction and/or gaze velocity values), and determines gaze events occurring at one or more points in time.

At block 520, pose stabilization and saccade rejection are applied to the gaze data and/or gaze classifications. The pose stabilization may adjust pose (e.g., position and orientation) for eye twitch and/or small eye movements that do not correspond to intentional/perceptive user eye movements. The saccade rejection may involve may use gaze confidence, tracking state, pupil center, pupil diameter, inter-pupillary distance (IPD), gaze ray data, and velocity data to detect saccades and blinks for removal and/or identify fixations for gaze interactions. It may distinguish between fixations and saccades to facilitate more accurate gaze-based input. The saccade rejection may involve identifying eye gaze events that correspond to involuntary/reflexive eye saccades and removing (e.g., filtering out) those events (e.g., altering the gaze data to remove gaze data corresponding to those types of gaze events).

At block 530 (hit test manager), the eye gaze data (e.g., eye gaze-holding events identified within the stabilized and saccade removed eye gaze data) is assessed along with user interface collision data 540 to identify eye events corresponding to particular user interface elements. For example, a user interface on a virtual 2D surface or within a 3D region may be presented within a field of view of a 3D environment. Gaze directions of gaze-holding events within that 3D environment may be assessed relative to the user interface elements (e.g., to identify when gaze directions of the gaze-holding events intersect with (or are close to) particular user interface elements). For example, this may involve determining that the user is gazing at a particular user interface element at a particular point in time when a gaze-holding event is occurring.

In some implementations, a hit testing process is utilized that may use gaze ray data, confidence data, gesture data (e.g., hand motion classification), fixation cluster spread data, etc. to loosen/tighten a gaze area based on precision of gaze tracking and/or user behavior. This process may utilize UI geometry data, for example, from simulation system that is based on UI information provided by applications, e.g., identifying interaction targets (e.g., which UI elements to associate with a given user activity).

At block 560 (pinch & gaze association), hand data 550 is associated with the gaze-holding events and associated user interface elements identified at block 530 (by the hit test manager). This may involve determining that a hand gesture that occurs at a particular instant in time or during a particular period of time should be associated with a particular gaze-holding event and its associated user interface element. As described herein, such association may be based on timing and/or other criteria.

At block 570 (interaction state manager), the hand data 550 associated with gaze-holding events and associated user interface element is used to manage interactions. For example, user input events may be provided to an application that is providing a user interface so that the application can respond to the user input events (e.g., by changing the user interface). The user input events may identify the user interface element that a given input is associated with (e.g., identifying that the user has provided gaze-plus-pinch input selecting element A, that the user has provided pinch input moving 10 distance units (e.g., in cm, m, km, inches, feet, miles, etc.) to the left, that the user has released a pinch, etc. User input is thus recognized and used to trigger interaction state updates, in FIG. 5.

Figure 6:
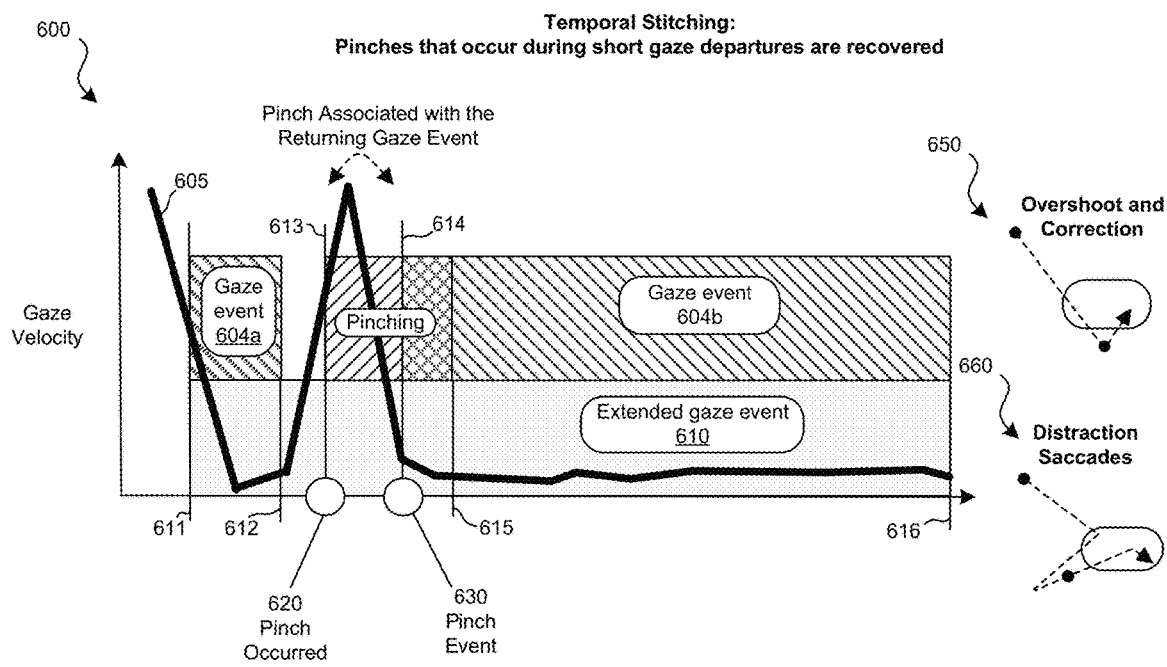
FIG. 6 illustrates associating a pinch with a gaze event on a chart showing gaze velocity over time in accordance with some implementations.

FIG. 6 illustrates a chart 600 showing gaze velocity 605 occurring over time. In this example, during an extended gaze event 610 between times 611 and 616, a user gazing at a user interface element is interrupted by a short gaze departure between times 612 and 614. Thus, the user's gaze is directed at the user interface element between times 611 and 612 and between times 614 and 616, as shown in the chart 600. The user pinches between times 613 and 615, with the pinch make occurrence 620 occurring at time 613 and the pinch break (e.g., release of the pinch) occurring at time 615. The initial portion of the pinch occurs between times 613 and 614, during which the short gaze departure is also occurring (e.g., during an overshoot and correction 650 or distraction saccade 660 event). The short gaze departure, however, is identified based on the gaze velocity during its occurrence (during the time period between time 612 and time 614) and only gaze-holding events 604a and 604b are considered with respect to potential association with the pinch make occurrence 620. In this example, the pinch occurrence 620 is associated with one of the gaze events 604a, 604b. Criteria may be used to select amongst multiple potential gaze events, e.g., prioritizing a gaze event following a pinch (e.g., gaze event 604b) if it occurs within a predetermined time and otherwise utilizing a previous gaze event. In this example, the pinch occurrence 620 is associated with gaze event 604b at pinch event 630, i.e., the gaze (and corresponding gazed-upon user interface item) at time 615. Accordingly, the pinch occurring during the short gaze departure between times 612 and 614 is recovered and associated with the correct/intended gaze direction/user interface element.

Figure 7:
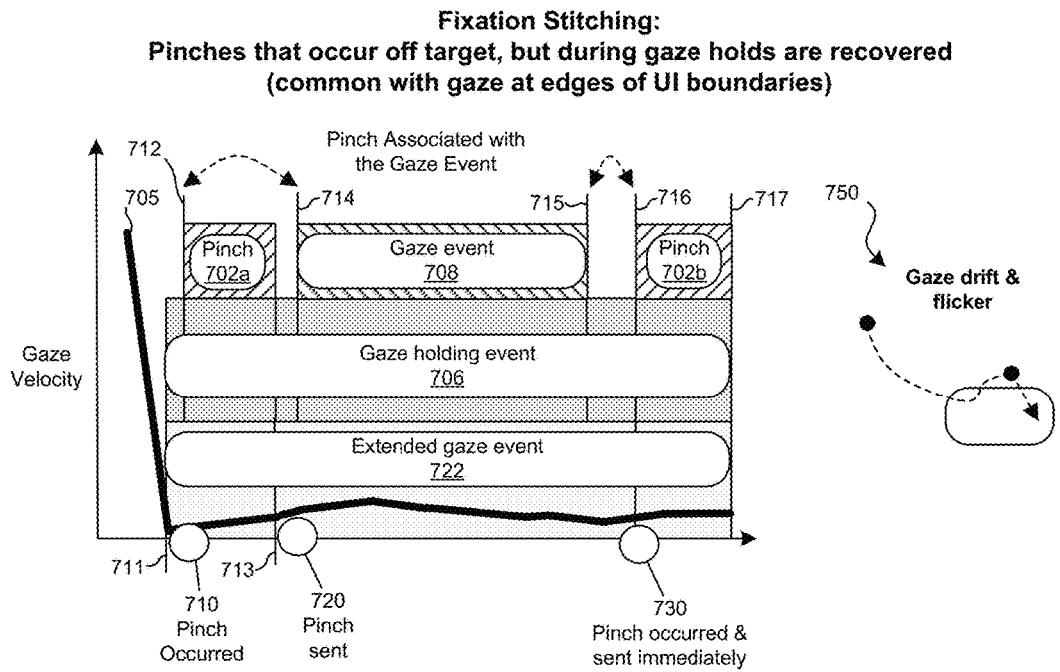
FIG. 7 illustrates associating pinches with a gaze event on a chart showing gaze velocity over time in accordance with some implementations.

FIG. 7 illustrates associating a pinch with a gaze event on a chart 700 showing gaze velocity 705 occurring over time. Such an association may be appropriate in various circumstances, for example, during gaze drift and flicker 750. In this example, during an extended gaze event 722 between times 711 and 717, pinches 702a-b occur off target (e.g., when the user is not looking at the intended target) but are recovered. In this example, a gaze-holding event 706 is detected as occurring during the time period between times 711 and 717 and a gaze event 708 (between times 714 and 715) within that gaze-holding event 706 can be associated with a user interface element. Between times 711 and 714 the user's gaze is relatively fixed but just outside the user interface element, between times 714 and 715 the user's gaze is relatively fixed within the user interface element, and between times 716 and 717 the user's gaze is relatively fixed just outside of the user interface element.

Pinches occurring during the gaze-holding event 706 are associated with the gaze event 708 with which there is a corresponding user interface element. Thus, the first pinch 702a (from time 712 to time 713) is associated with this gaze event 708 (and its corresponding UI element). Pinch 702a is identified and, based on it occurring during gaze holding event 706, the pinch 702a is associated with the user interface element corresponding to gaze event 708, e.g., the pinch is sent as illustrated at marker 720. Similarly, the second pinch 702b (from time 716 to time 717) is also associated with the gaze-holding event 706 (and its corresponding UI element). Pinch 702b is identified and, based on it occurring during the gaze holding event 706, the pinch 702b is associated with the user interface element corresponding to gaze event 708, e.g., the pinch is determined to have occurred and is sent immediately as illustrated at marker 730.

Figure 8:
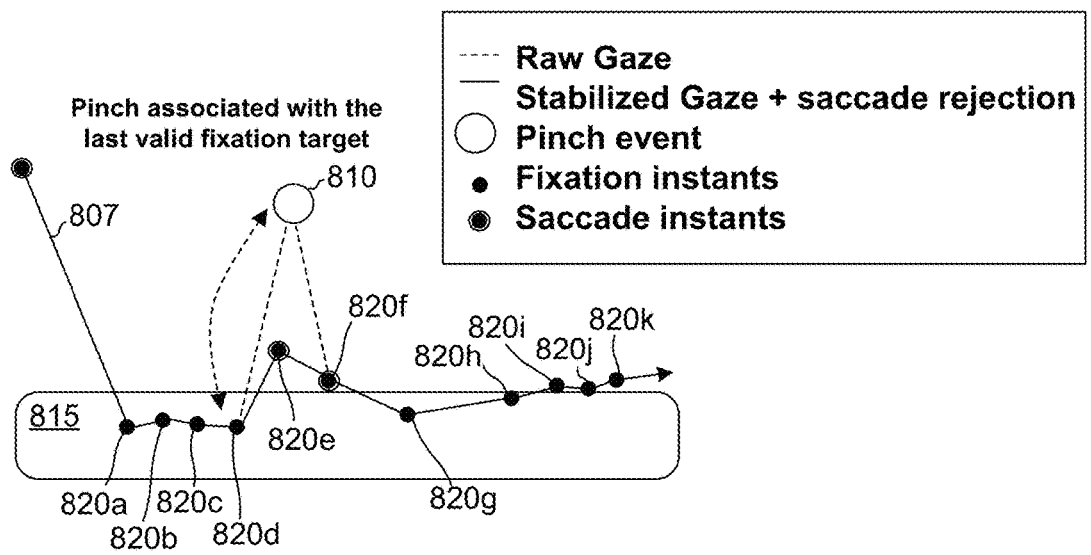
FIG. 8 illustrates associating a pinch with a gaze-holding event rather than a saccadic event in accordance with some implementations.

FIG. 8 illustrates associating a pinch 810 with a gaze-holding event rather than a saccadic event. In this example, the locations of the user's gaze 807 at multiple gaze events 820a-820k are illustrated relative to a user interface element 815. Gaze events 820a-820d and 820g-820k are each determined to be gaze-holding events based on analyzing gaze data. In contrast, gaze events 820e, 820f are determined to be saccade instants based on analyzing the gaze data. Gaze velocity and/or other information may be used to distinguish between gaze-holding events and saccades. Identifying the gaze-holding events may involve motion classification, pose stabilization, and/or blink removal.

In this example, a pinch 810 occurs during the saccade while the gaze is outside of the user interface element 815. However, the pinch 810 is not associated with a saccadic instant. Instead, the pinch 810 is associated with a valid target. In this instance, the process selects a valid target to associate using criteria, e.g., selecting the last valid target if such a target occurred within a previous threshold amount of time. In this example, a last valid target is selected, which is the location associated with the gaze event 820d. In this way, unintentional gaze motion (e.g., saccades, blinks, etc.) are not considered for association, since they are removed from the signal and not included in the valid fixation targets.

Figure 9:
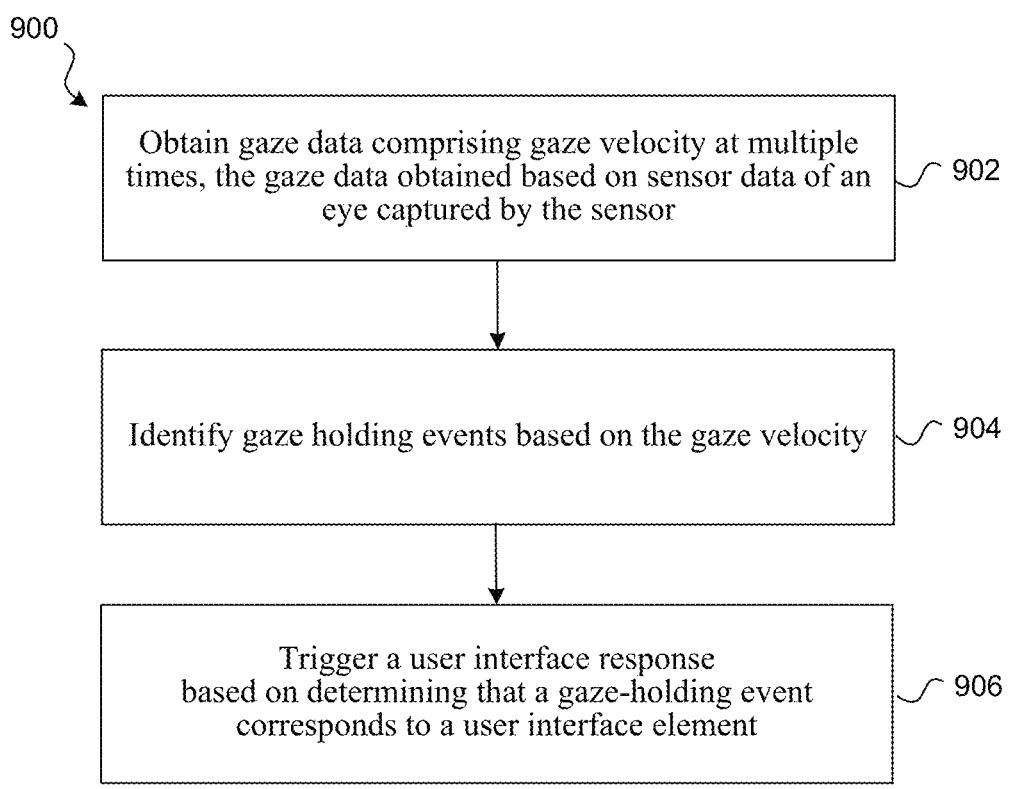
FIG. 9 is a flowchart illustrating a method for triggering a user interface response based on a gaze-holding event, in accordance with some implementations.

FIG. 9 is a flowchart illustrating a method 900 for triggering a user interface response based on a gaze-holding event. In some implementations, a device such as electronic device 110 performs method 900. In some implementations, method 900 is performed on a mobile device, desktop, laptop, HMD, or server device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 includes obtaining gaze data comprising gaze velocity at multiple times, the gaze data obtained based on sensor data of an eye captured by the one or more sensors. For example, the gaze data may be based on a signal of live gaze velocity data obtained based on a stream of live images of the eye captured by an inward facing camera of a head-mounted device (HMD).

At block 904, the method 900 includes identifying gaze-holding events based on the gaze velocity. Identifying the gaze-holding events may involve motion classification, pose stabilization, and/or blink removal. In some implementations, a gaze velocity signal is used to classify eye/gaze motion. Gaze velocity and/or position data may be stabilized, for example, to account for eye twitching and micro-eye movements not associated with voluntary or conscious behavior. In some implementations, an event rejection process is performed to remove gaze events that are associated with saccades, blinks, and other events with which user intentional and/or conscious interactions are not likely to be related.

At block 906, the method 900 includes triggering a user interface response based on determining that a gaze-holding event of the gaze-holding events corresponds to a user interface element. For example, based on a gaze-holding event having a gaze direction directed at a particular user interface icon, the method may include triggering a hover-type response by the user interface (e.g., highlighting that icon as a "hovered" or "in focus" element of the user interface). In another example, based on a gaze-holding event being directed at a particular user interface icon and an occurrence of a user activity (e.g., a pinch gesture) that is associated with the gaze-holding event, the method may include triggering a selection-type response by the user interface (e.g., triggering a selection or "clicked on" action on the user interface icon).

The method may include detecting that an activity has occurred, where the activity is distinct from the gaze-holding events. The activity may be a non-eye-based eye activity such as a pinch or other hand gesture. Examples of activity distinct from the gaze-holding events include activities that are separate from the eye, including, but are not limited to, single hand gestures, multi-hand gestures, head movements, torso movements, movements with arms or legs, whole body movements, and/or interactions with devices.

Single hand gestures include, but are not limited to, a user forming a shape/configuration and/or making a particular motion with a single hand, for example by pinching (e.g., touching a pointer or other finger to a thumb), grasping (e.g., forming hand into a ball shape), pointing (e.g., by extending one or more fingers in a particular direction), or performing a multi-finger gesture. One example of a hand gesture involves a user pinching where the pinching (e.g., touching finger to thumb and then releasing) provides input (e.g., selection of whatever the user is gazing upon). Another example of a hand gesture involves a user pinching (e.g., to initiate detection of the gesture) followed by a movement or change to the hand while the pinching is maintained (e.g., pinching and then moving the hand to provide a directional input movement based on the direction of the movement of the hand).

One example of a multi-finger gesture is a user spreading all fingers apart (e.g., configuring the hand so that no finger touches any other finger). Another example of a multi-finger gesture is a multi-finger swipe (e.g., extending two or more fingers and moving those fingers along a particular path or across a particular real or virtual surface). Another example of a multi-finger gesture is a hand-held approximately flat with fingers all touching adjacent fingers. Another example of a multi-finger gesture is two fingers extended in a peace-sign configuration. Another example of a multi-finger gesture is all fingers extending straight from the palm and then bent at their respective knuckles. Another example of a multi-finger gesture is the thumb touching two or more of the fingers' tips in a particular sequence (e.g., first touching the pointer finger then touching the pinky finger). Another example of a multi-finger gesture is fingers held in a particular configuration (e.g., pointer touching middle finger, middle finger not touching ring finger, ring finger touching pinky finger while the whole hand moves along a particular path (e.g., up and down)).

Multi-hand gestures include, but are not limited to, a user forming a shape/configuration and/or making a particular motion with both hands simultaneously or within a threshold amount of time of one another (e.g., within a 2 second time window). One example of a multi-hand gesture involves a user pinching both hands where the pinching (e.g., touching finger to thumb and then releasing on both hands within a threshold amount of time) provides input (e.g., a particular interaction with whatever the user is gazing upon). Another example of a multi-hand gesture involves a user pinching with both hands within a threshold amount of time of one another (e.g., to initiate detection of the gesture) followed by a movement or change to one or both of the hands while the pinching is maintained (e.g., (a) pinching both hands and then moving the hands towards or apart from one another to provide a zoom in or zoom out input, (b) pinching both hands and then moving both hands left, right, up, down, etc. simultaneously and together to provide a panning input in the direction of movement, or (c) pinching both hands and the moving the hands in a way that maintains the distance between hands while changing their relative positioning to provide rotation input based on the change (e.g., as if holding a string between the hands and rotating the string to provide corresponding rotation input to a user interface element)).

Multi-hand gestures may involve each hand performing a gesture, for example, by pinching (e.g., touching a pointer or other finger to a thumb), grasping (e.g., forming hand into a ball shape), pointing (e.g., by extending one or more fingers in a particular direction), or performing a multi-finger gesture. In one example, a multi-hand gesture is provided (or initiated) by both hands pinching at the same time (e.g., within a threshold time of one another). In one example, a combined (e.g., multi-hand) gesture is based on the timing between two initiation actions (e.g., pinches performed by each hand) and/or the hands proximity to one another.

Head gestures may involve a movement of the head with respect to a degree of freedom (e.g., translating, rotating, etc.). Head movement may involve, but is not limited to, a head nodding, shaking, or tilting.

User activity to be associated with a gaze direction may involve user input provided via a device (e.g., a device separate from the HMD or other device that is sensing the user's gaze direction). Such a device may be an input device such as a keyboard, mouse, VR controller, ring, a wearable device such as a watch, a hand-held device such as a phone, tablet, or laptop, or any other type of device capable of interaction or user input.

User activity may involve a user using a hand to interact with a controller or other input device, pressing a hot key, nodding their head, turning their torso, making a facial expression, jumping, sitting, or any other activity performed by a user separate from the user's eye gaze. The activity may be detected based on sensor data (e.g., from an outward facing camera) or based on input device data. The activity may be static (e.g., a user holding a hand steady in a particular configuration), or non-static (e.g., a user making a particular motion such as moving a hand while holding a pinch hand configuration).

In some implementations, a physical keyboard device has one or more keys that correspond to particular gestures. Such keys may be used along with gaze information to interpret user activity. For example, a user may type on the keyboard to provide keyboard based input (e.g., entering characters such as "a," "b," "?," etc.) and at or around the same time also use gaze to provide input. The user may gaze at a position on a text entry window and select a "pinch" key on the keyboard to initiate an action at the gazed-upon location. Thus, the user may be able to utilize the keyboard and provide gaze/pinch type input without needing to remove their hand(s) from the keyboard position (e.g., without reaching off of or away from the keyboard to interact with a mouse, trackpad, or make a spatially-separated/off keyboard pinching gesture). Rather the user's hands may remain in place hovering above the keyboard. In other implementations, a user is enabled to make a pinching gesture with their hands on or just above a keyboard rather than or in addition to using a pinch key on the keyboard. In some implementations, a device such as a keyboard has a dedicated or assigned key (or button) that corresponds to a pinch (or equivalent) interaction of a pinch and gaze interaction. An HMD may display distinguishing visual characteristics around such a key or button so that the user recognizes its special functionality. Similarly, special or otherwise distinguishing sounds may be presented when such a key is used to further emphasize or distinguish the key or button from other functions on the keyboard or other physical input device.

The method 900 may associate a gaze-holding event with the activity. Accordingly, in various implementations, a gaze-holding event is associated with one or more of a gesture made by a single hand, a gesture that involves one or more fingers, a gesture made by multiple hands, a gesture made by a head, a gesture made by hand and head positions/movements made at approximately the same time, and/or inputs to a device such as a controller, input device, wearable device, or hand-held device.

Associating the gaze-holding event with the activity may be based on determining that activity occurred during the gaze-holding event. Associating the gaze-holding event with the activity may involve determining that the activity did not occur during any of the gaze-holding events and determining that the activity occurred within a threshold time after the gaze-holding event. Associating the gaze-holding event with the activity may involve determining that the activity did not occur during any of the gaze-holding events, determining that the activity did not occur within a threshold time after any of the gaze-holding events, and determining that the gaze-holding event occurred within a threshold time after the activity.

In some implementations, the method 900 includes associating a gaze-holding event with another user activity (e.g., a pinch) during the presentation of content on a device such as an HMD. In such implementations, the gaze-holding event may be associated with the user gazing at a portion of the content that is being presented and thus the association may associate the other user activity (e.g., the pinch) with that portion of the content. In some implementations, the content is provided within a view of a 3D environment such as an XR environment. In some implementation, the view comprises only virtual content. In some implementations, the view comprises mixed reality or augmented reality content. In some implementations, at least a portion of 3D environment depicted in the view corresponds to a physical environment proximate the device (e.g., via passthrough video or via a see-through (e.g., transparent) portion of the device). In some implementations, a 3D environment is not presented. For example, a user's gaze-holding events may be associated with input that is received while the user gazes at and provides activity that is input to a device such as a smart phone or tablet (i.e., a device that does not present 3D content or use stereoscopic display to display content at different depths).

Gaze velocity data may be assessed or filtered in a way that accounts for fast fixation inaccuracies such as those associated with short duration gaze-holding events that occur following significant gaze-shifting/saccadic events. For example, the method may include ignoring potential gaze-holding events that have a short duration and that follow a gaze shifting/saccadic event in which the gaze has shifted more than a threshold amount or at more than threshold rate (e.g., based on absolute gaze directional change amount or gaze velocity associated with a saccadic event). In some implementations, gaze-holding events that are identified based on gaze velocity exclude potential gaze-holding events occurring during a time period following a saccadic event in the velocity data where the saccadic event has an amplitude greater than a threshold. In some implementations, gaze-holding events that are identified based on gaze velocity exclude potential gaze-holding events occurring during a time period following a saccadic event in the velocity data where the saccadic event has velocity that is greater than a threshold velocity and/or changes at a rate that is greater than a threshold rate of change. Furthermore, in some additional or alternative implementations, gaze-holding events that are identified based on gaze travel exclude potential gaze-holding events occurring during a time period following a saccadic event in the eye tracking data where the saccadic event has a distance of eye travel that is greater than a threshold distance.

Gaze-holding events or portions thereof may be rejected from consideration with respect to providing user interface responses based on various criteria. In some implementations, this involves rejecting the gaze-holding (e.g., a portion of a gaze-holding event) for a period in the beginning of the gaze-holding (and accepting the rest) even when the gaze-holding event might take longer than the rejection period. A user may saccade and land on a target next to their intended target, and then from there drift slowly to the intended target. In this case, the time from landing on the neighbor target and the drifting is rejected, but the portion of the gaze-holding event occurring after landing on the intended target is accepted.

Some implementations reduce or prevent gaze flicker (e.g., preventing UI highlighting in response to gaze when it is not yet settled). Some implementations utilize rules to exclude initial portions of a gaze holding event, e.g., after certain large saccadic motions, to allow gaze to settle before shifting focus from a previous UI element to a new UI element on which the gaze has now settled. Some implementations use such an exclusion for only some types of actions, e.g., exclusions only applicable to gaze highlighting. Thus, in this example, if the user pinches during that initial gaze holding event—the pinch action will be sent immediately and associated with the new UI element on which gaze is now holding. The exclusion may be time based, e.g., after small saccades excluding the first 44 ms of gaze holding and after large saccades excluding the first 88 ms. In some implementations, at least a potential gaze-holding event occurring during a time period following a saccadic event is excluded, where the potential gaze-holding event is excluded based on (a) an amplitude representing an amount of velocity change during the saccadic event, (b) a rate of change of the velocity during the saccadic event, (c) a duration of the potential gaze-holding event, and/or (d) distance of eye travel during the saccadic event.

In some implementations, a potential gaze-holding event is excluded based on it occurring between two saccadic events having one or more particular characteristics such as those described above. For example, in the case where there is a large saccade, a short intermediate gaze-holding event and then another large saccade, the intermediate gaze-holding event may be rejected.

In some implementation, a small saccade following one or more large saccades that might be erroneously classified as a gaze-holding event is correctly characterized (i.e., as a small saccade rather than a gaze-holding event) based on determining that it follows a saccadic event having one or more particular characteristics such as those described above. Similarly, a gaze classifier may classify gaze data associated with a continuous saccade by falsely identifying a gap (and thus classifying the second portion of the saccade as a gaze-holding event). Such an erroneous classification may be correctly characterized (e.g., as a saccadic event rather than a gaze-holding event) based on determining that it follows a saccadic event having one or more particular characteristics such as those described above.

Excluding potential gaze events in such circumstances may be beneficial because when a user makes a large eye movement (e.g., a saccade of large amplitude), the eye may not go as quickly to an intended gaze target as in other circumstances. When the eye makes a large eye movement, it often does not land exactly where the user intends (e.g., on an intended user interface target). Often, the eyes naturally land around the general area (not on it exactly) and then move and adjusts to the exact location of the intended user interface element following subsequent gaze-holding event (s).

The system may exclude the one or more initial gaze-holding events (e.g., due to velocity, distance of eye travel, time-proximity to a significant gaze shifting event, etc.) following a significant gaze shift (e.g., high-amplitude saccadic event). For example, following a blink or gaze loss, an initial portion (e.g., 88 ms) of a gaze holding event may be excluded. The system may interpret a later gaze-holding event as the appropriate gaze-holding event to use to identify gaze direction in a triggered user interface response. After a saccade, for example, averaging may be used. For example, this may involve using a simple 4-tap averaging process to the 1-sample difference of the gaze during saccade, (e.g., a distance equivalent to the distance traveled during the last 4 frames divided by 4). In one example, if the average is less than a threshold, when the saccade finishes, the exclusion period may be 44 ms, otherwise it is 88 ms. Different time thresholds may of course be used.

Excluding gaze-holding events that occur soon after such large eye movements may thus help ensure that a gaze-holding event is only used to trigger user interface responses in circumstances in which the gaze-holding event is likely to have a gaze direction that corresponds to an intended gaze target.

Figure 10:
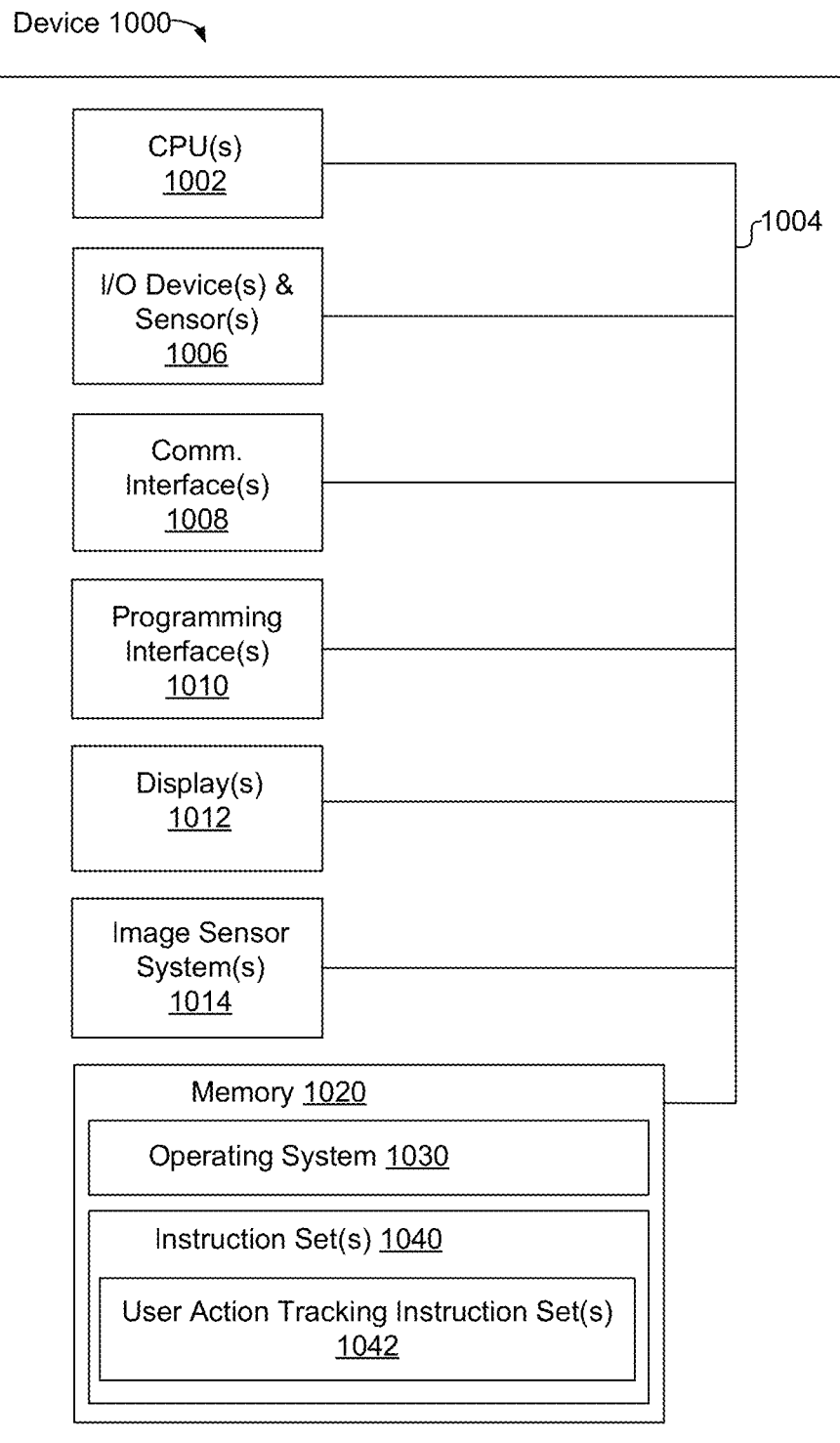
FIG. 10 is a block diagram of an electronic device of in accordance with some implementations.

FIG. 10 is a block diagram of electronic device 1000. Device 1000 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1012 include one or more displays configured to present a view of a 3D environment to the user. In some implementations, the one or more displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1000 includes a single display. In another example, the device 1000 includes a display for each eye of the user.

In some implementations, the one or more output device(s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include user action tracking instruction set(s) 1042 configured to, upon execution, associate user activity with gaze-holding events as described herein. The instruction set(s) 1040 may be embodied as a single software executable or multiple software executables.

Although the instruction set(s) 1040 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor and one or more sensors:
   obtaining gaze motion classification data that was generated based on sensor data of an eye captured by the one or more sensors, the gaze motion classification data distinguishing a gaze period associated with a gaze-holding event from a gaze period associated with a non-gaze-holding event,
   the gaze period associated with the gaze-holding event comprising a time period that includes a first type of eye behavior and
   the gaze period associated with the non-gaze-holding event comprising a time period that includes a second type of eye behavior different than the first type of eye behavior;
   detecting a user activity; and
   triggering a user interface response based on the user activity and the gaze motion classification data.

2. The method of claim 1, wherein:
   the user activity is a gaze in a gaze direction occurring during the gaze-holding event; and
   the user interface response comprises providing an indication of user attention to a user interface element based on determining that the gaze-holding event corresponds to the user interface element.

3. The method of claim 1, wherein:
   the user activity is a gesture or input device interaction distinct from a gaze;
   the gaze-holding event is associated with the user activity; and
   the user interface response is triggered based on associating the user activity with a user interface element.

4. The method of claim 3, wherein associating the gaze-holding event with the user activity is based on determining that the user activity occurred during the gaze-holding event.

5. The method of claim 3, wherein associating the gaze-holding event with the user activity comprises:
   determining that the user activity did not occur during any of one or more gaze-holding events; and
   determining that the user activity occurred within a threshold time after the gaze-holding event.

6. The method of claim 3, wherein associating the gaze-holding event with the user activity comprises:
   determining that the user activity did not occur during any of one or more gaze-holding events;
   determining that the user activity did not occur within a threshold time after any of the one or more gaze-holding events; and
   determining that the gaze-holding event occurred within a threshold time after the user activity.

7. The method of claim 3, wherein the user activity is:
   a finger pinch;
   a multi-finger gesture;
   a hand grasping gesture;
   finger pinches made by both hands;
   grasping gestures made by both hands;
   a gesture made by moving both hands relative to one another;
   a head movement;
   user input provided via a hand-held device;
   user input provided via an input device; or
   user input provided via a wearable device.

8. The method of claim 3, wherein the user activity is detected based on images captured from an outward-facing camera of a head-mounted device.

9. The method of claim 1, wherein obtaining the gaze motion classification data comprises receiving a signal of live gaze velocity data based on a stream of live images of the eye.

10. The method of claim 1, wherein identifying the gaze-holding events comprises:
    motion classification;
    pose stabilization; or
    blink removal.

11. The method of claim 1, wherein:
    the user activity a saccadic event having a characteristic that exceeds a threshold; and
    the user interface response is based on excluding a potential gaze-holding event or a portion of a gaze-holding event occurring during a time period following the saccadic event.

12. The method of claim 1, further comprising identifying gaze-holding events based on gaze velocity, wherein identifying the gaze-holding events comprises excluding a potential gaze-holding event or a portion of the potential gaze-holding event occurring during a time period following a saccadic event, wherein the potential gaze-holding event or the portion of the potential gaze-holding event is excluded based on:
(a) an amplitude representing velocity change during the saccadic event;
(b) a rate of change of velocity during the saccadic event;
(c) a duration of the potential gaze-holding event; or
(d) distance of eye travel during the saccadic event.

13. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining gaze motion classification data that was generated based on sensor data of an eye captured by the one or more sensors, the gaze motion classification data distinguishing a gaze period associated with a gaze-holding event from a gaze period associated with a non-gaze-holding even,
the gaze period associated with the gaze-holding event comprising a time period that includes a first type of eye behavior and
the gaze period associated with the non-gaze-holding event comprising a time period that includes a second type of eye behavior different than the first type of eye behavior;
detecting a user activity; and
triggering a user interface response based on the user activity and the gaze motion classification data.

14. The system of claim 13, wherein:
the user activity is a gaze in a gaze direction occurring during the gaze-holding event; and
the user interface response comprises providing an indication of user attention to a user interface element based on determining that the gaze-holding event corresponds to the user interface element.

15. The system of claim 13, wherein:
the user activity is a gesture or input device interaction distinct from the gaze;
the gaze-holding event is associated with the user activity; and
the user interface response is triggered based on associating the user activity with a user interface element.

16. The system of claim 15, wherein associating the gaze-holding event with the user activity based on determining that the user activity occurred during the gaze-holding event.

17. The system of claim 15, wherein associating the gaze-holding event with the user activity comprises:
determining that the user activity did not occur during any of one or more gaze-holding events; and
determining that the user activity occurred within a threshold time after the gaze-holding event.

18. The system of claim 15, wherein associating the gaze-holding event with the user activity comprises:
determining that the user activity did not occur during any of one or more gaze-holding events;
determining that the user activity did not occur within a threshold time after any of the one or more gaze-holding events; and
determining that the gaze-holding event occurred within a threshold time after the user activity.

19. The system of claim 15, wherein the user activity is:
a finger pinch;
a multi-finger gesture;
a hand grasping gesture;
finger pinches made by both hands;
grasping gestures made by both hands;
a gesture made by moving both hands relative to one another;
a head movement;
user input provided via a hand-held device;
user input provided via an input device; or
user input provided via a wearable device.

20. The system of claim 15, wherein the user activity is detected based on images captured from an outward-facing camera of a head-mounted device.

21. The system of claim 15, wherein obtaining the gaze motion classification data comprises receiving a signal of live gaze velocity data based on a stream of live images of the eye.

22. The system of claim 13, wherein identifying the gaze-holding events comprises:
motion classification;
pose stabilization; or
blink removal.

23. The system of claim 13, wherein:
the user activity is a saccadic event having a characteristic that exceeds a threshold; and
the user interface response is based on excluding a potential gaze-holding event or a portion of a gaze-holding event occurring during a time period following the saccadic event.

24. The system of claim 13, further comprising identifying gaze-holding events based on gaze velocity, wherein identifying the gaze-holding events comprises excluding a potential gaze-holding event or a portion of the potential gaze-holding event occurring during a time period following a saccadic event, wherein the potential gaze-holding event or the portion of the potential gaze-holding event is excluded based on:
(a) an amplitude representing velocity change during the saccadic event;
(b) a rate of change of velocity during the saccadic event;
(c) a duration of the potential gaze-holding event; or
(d) distance of eye travel during the saccadic event.

25. A non-transitory computer-readable storage medium storing program instructions executable via one or more processors to perform operations comprising:
obtaining gaze motion classification data that was generated based on sensor data of an eye captured by the one or more sensors, the gaze motion classification data distinguishing a gaze period associated with a gaze-holding event from a gaze period associated with a non-gaze-holding event,
the gaze period associated with the gaze-holding event comprising a time period that includes a first type of eye behavior and
the gaze period associated with the non-gaze-holding event comprising a time period that includes a second type of eye behavior different than the first type of eye behavior;
detecting a user activity; and
triggering a user interface response based on the user activity and the gaze motion classification data.

* * * * *

UNITED STATES PATENT AND TRADEMARK OFFICE
CERTIFICATE OF CORRECTION

PATENT NO. : 12,099,653 B2
APPLICATION NO. : 18/244570
DATED : September 24, 2024
INVENTOR(S) : Vinay Chawda et al.

Page 1 of 1

It is certified that error appears in the above-identified patent and that said Letters Patent is hereby corrected as shown below:

In the Claims

Claim 11, Column 26, Line 58 reads:
"… the user activity a saccadic event having a characteristic …"
Should read:
--… the user activity is a saccadic event having a characteristic …--

Claim 13, Column 27, Line 23 reads:
"… non-gaze-holding even, …"
Should read:
--… non-gaze-holding event, …--

Signed and Sealed this
Twenty-second Day of October, 2024

Katherine Kelly Vidal
*Director of the United States Patent and Trademark Office*